(12) United States Patent
Alexander et al.

(10) Patent No.: US 10,571,304 B2
(45) Date of Patent: Feb. 25, 2020

(54) HVAC ACTUATOR WITH INDUCTIVE POSITION SENSING

(71) Applicant: Johnson Controls Technology Company, Plymouth, MI (US)

(72) Inventors: Robert K. Alexander, Menomonee Falls, WI (US); Gary A. Romanowich, Slinger, WI (US); Russell T. Jenks, Racine, WI (US); Cory C. Strebe, Wauwatosa, WI (US); Kevin A. Weiss, Gurnee, IL (US)

(73) Assignee: Johnson Controls Technology Company, Auburn Hills, MI (US)

( * ) Notice: Subject to any disclaimer, the term of this patent is extended or adjusted under 35 U.S.C. 154(b) by 589 days.

(21) Appl. No.: 15/331,761

(22) Filed: Oct. 21, 2016

(65) Prior Publication Data
US 2017/0146256 A1    May 25, 2017

Related U.S. Application Data

(60) Provisional application No. 62/260,138, filed on Nov. 25, 2015.

(51) Int. Cl.
*H02P 6/18*         (2016.01)
*H02P 27/06*        (2006.01)
(Continued)

(52) U.S. Cl.
CPC ............... *G01D 5/202* (2013.01); *F24F 11/30* (2018.01); *F24F 11/62* (2018.01); *F24F 11/70* (2018.01);
(Continued)

(58) Field of Classification Search
CPC ........ H02P 25/06; H01L 39/126; H02K 11/21
See application file for complete search history.

(56) References Cited

U.S. PATENT DOCUMENTS 4,638,250 A    1/1987  Shen-Orr et al.
6,236,199 B1 *  5/2001  Irle ..................... G01D 5/2093
                                                324/207.17
(Continued)

FOREIGN PATENT DOCUMENTS

WO    WO 2004/036147    4/2004

OTHER PUBLICATIONS

Extended Search Report for European Application No. 16196826, dated Apr. 25, 2017, 7 pages.

*Primary Examiner* — Bickey Dhakal
*Assistant Examiner* — Charles S Laughlin
(74) *Attorney, Agent, or Firm* — Foley & Lardner LLP

(57) ABSTRACT

An actuator in a HVAC system includes an inductive sensor, a conductive target, and a controller. The conductive target has multiple different portions that become aligned with the inductive sensor as a position of the actuator changes. Each of the multiple different portions have a different inductance. The controller receives a signal from the inductive sensor indicating an observed inductance of the portion of the conductive target aligned with the inductive sensor. The controller uses a stored relationship between the observed inductance and the position of the actuator to determine the position of the actuator based on the observed inductance. The controller operates the actuator to change the position of the actuator based on the determined position.

19 Claims, 15 Drawing Sheets

(51) Int. Cl.
  *H02P 23/14* (2006.01)
  *G01D 5/20* (2006.01)
  *F24F 11/30* (2018.01)
  *F24F 11/62* (2018.01)
  *F24F 11/70* (2018.01)
  *F24F 110/00* (2018.01)
  *F24F 140/40* (2018.01)
  *F24F 11/64* (2018.01)
  *F24F 11/56* (2018.01)

(52) U.S. Cl.
  CPC ............... *F24F 11/56* (2018.01); *F24F 11/64* (2018.01); *F24F 2110/00* (2018.01); *F24F 2140/40* (2018.01)

(56) References Cited

U.S. PATENT DOCUMENTS

| | | |
|---|---|---|
| 8,947,031 B1 | 2/2015 | Diamond et al. |
| 9,062,893 B2 | 6/2015 | Romanowich et al. |
| 9,077,232 B2 | 7/2015 | Alexander et al. |
| 2007/0046236 A1 | 3/2007 | McMillan et al. |
| 2009/0144979 A1* | 6/2009 | Sciuto ............... F02D 9/105 29/888.4 |
| 2010/0319658 A1* | 12/2010 | Uchiyama ............... F02D 9/105 123/337 |
| 2015/0108933 A1 | 4/2015 | Diamond et al. |
| 2015/0260425 A1 | 9/2015 | Romanowich et al. |
| 2015/0295475 A1 | 10/2015 | Alexander et al. |
| 2015/0333669 A1 | 11/2015 | Alexander et al. |
| 2016/0061468 A1 | 3/2016 | Alexander et al. |
| 2016/0061480 A1 | 3/2016 | Alexander |
| 2016/0156299 A1 | 6/2016 | Romanowich et al. |

* cited by examiner

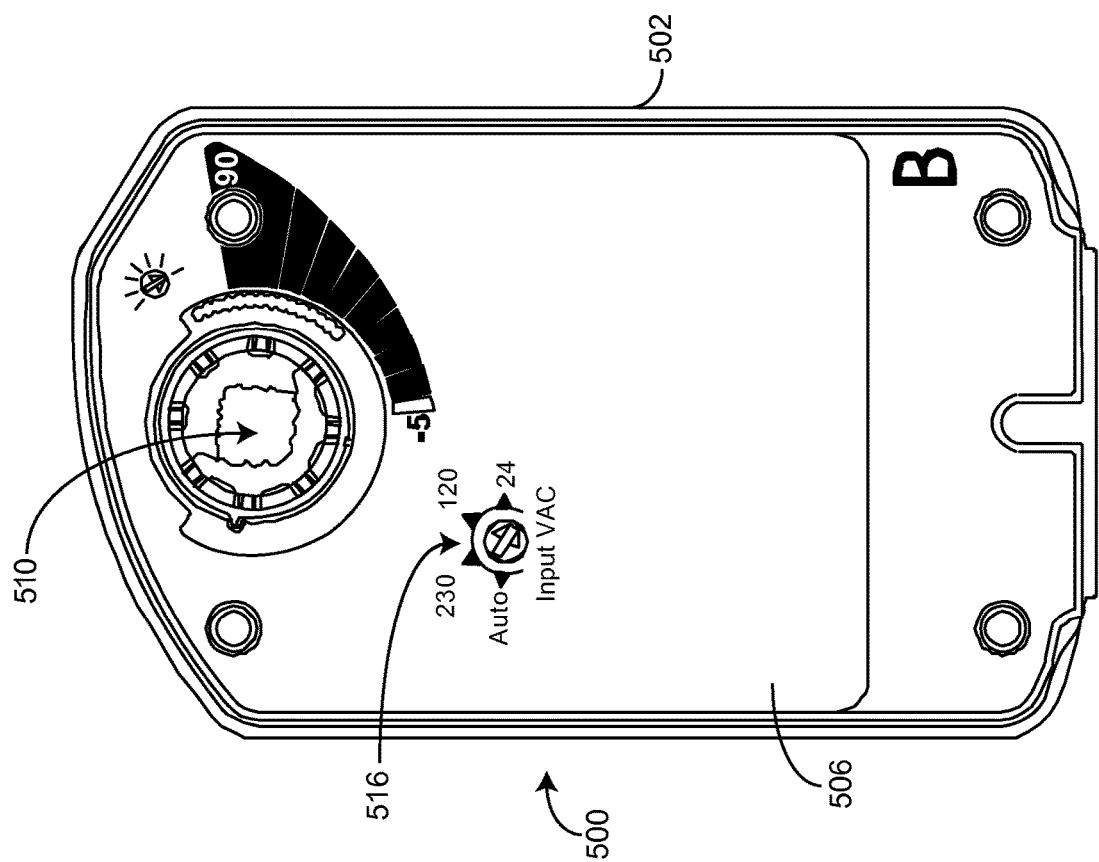
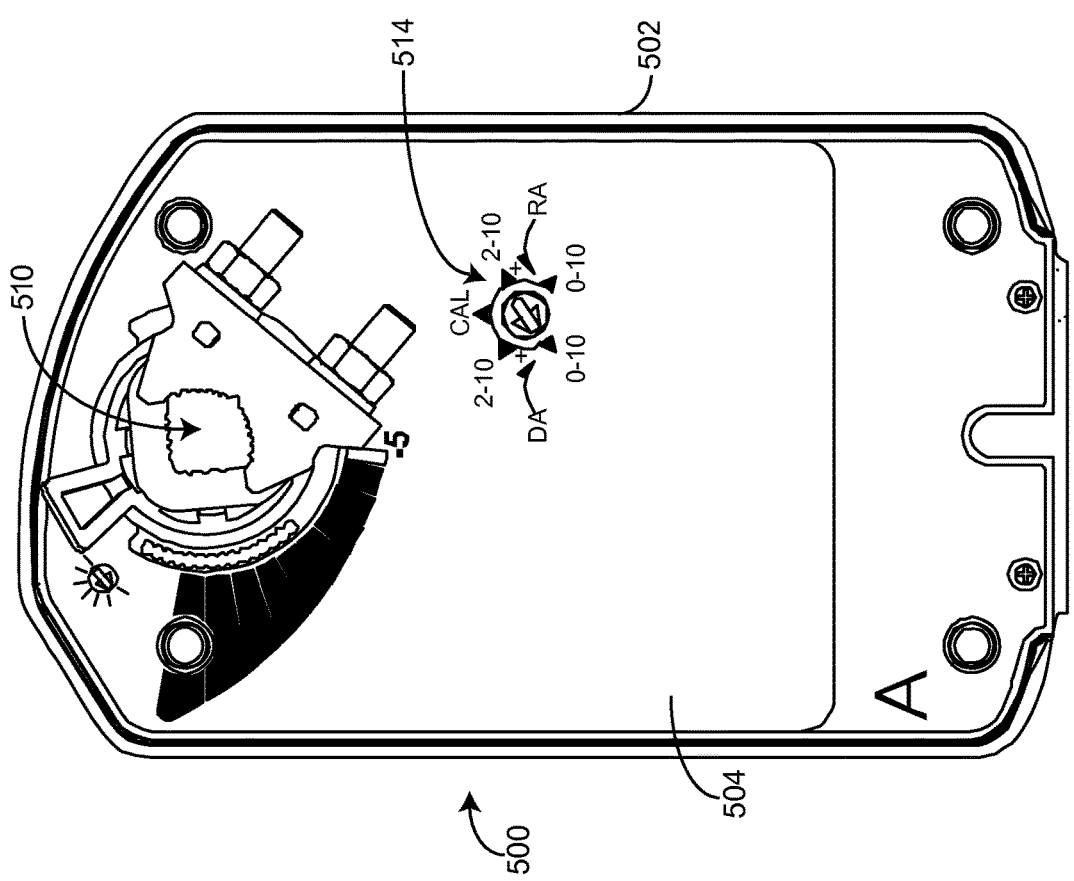
FIG. 7
FIG. 6

HVAC ACTUATOR WITH INDUCTIVE POSITION SENSING

CROSS-REFERENCE TO RELATED PATENT APPLICATION

This application claims the benefit of and priority to U.S. Provisional Patent Application No. 62/260,138 filed Nov. 25, 2015, the entire disclosure of which is incorporated by reference herein.

BACKGROUND

The present disclosure relates generally to actuators for use in a heating, ventilating, or air conditioning (HVAC) system and more particularly to systems and methods for determining the position of HVAC actuators.

HVAC actuators are used to operate a wide variety of HVAC components such as air dampers, fluid valves, air handling units, and other components that are typically used in HVAC systems. For example, an actuator may be coupled to a damper in a HVAC system and may be used to drive the damper between an open position and a closed position. A HVAC actuator typically includes a motor and a drive device (e.g., a hub, a gear train, etc.) that is driven by the motor and coupled to the HVAC component.

HVAC actuators typically require accurate position feedback for use in closed-loop control systems. Some HVAC actuators use resistive potentiometers to measure actuator position. For example, a sliding component of the resistive potentiometer may be coupled to the gear train of the actuator such that a change in actuator position causes a corresponding change in the resistance of the potentiometer. Resistive potentiometers typically require a physical connection to the gear train and are therefore susceptible to wear and degradation as the actuator moves between positions.

Other HVAC actuators use Hall effect sensors to measure actuator position. For example, one or more permanent magnets may be coupled to the gear train of the actuator such that a change in actuator position causes the permanent magnets to move past the Hall effect sensors. The Hall effect sensors provide an output to an electronic circuit, which records a count each time a magnet moves past a Hall effect sensor. Each count may correspond to a known change in actuator position (e.g., 0.1 degrees per count).

One disadvantage of using Hall effect sensors to measure actuator position is that power is required to monitor feedback from the Hall effect sensors. If the actuator position is changed when the actuator is not powered (e.g., a user manually moving the actuator), the electronic circuit is unable to record the sensor counts and cannot track the change in actuator position. It would be desirable to provide a system and method for determining actuator position that overcomes the disadvantages of conventional position sensing techniques.

SUMMARY

One implementation of the present disclosure is an actuator in a HVAC system. The actuator includes a motor, a drive device driven by the motor, an inductive sensor, a conductive target, and a controller. The drive device is coupled to a movable HVAC component for driving the movable HVAC component between multiple positions. The conductive target is coupled to the drive device such that a portion of the conductive target aligns with the inductive sensor. Multiple different portions of the conductive target become aligned with the inductive sensor as the movable HVAC component is driven between the multiple positions. Each of the multiple different portions has a different inductance. The controller receives a signal from the inductive sensor indicating an observed inductance of the portion of the conductive target aligned with the inductive sensor, uses a stored relationship between the observed inductance and a position of the drive device to determine the position of the drive device based on the observed inductance, and operates the motor to change a position of the movable HVAC component based on the determined position.

In some embodiments, the inductive sensor is fixed to a stationary component of the actuator and the conductive target moves relative to the inductive sensor as the movable HVAC component is driven between the multiple positions.

In some embodiments, the actuator is a rotary actuator including a sector gear that rotates as the movable HVAC component is driven between the multiple positions. The conductive target may be coupled to the sector gear and may move along with the sector gear.

In some embodiments, the actuator is a linear actuator including a linear component that moves along a linear range of motion as the movable HVAC component is driven between the multiple positions. The conductive target may be coupled to the linear component and may move along with the linear component.

In some embodiments, the conductive target is coupled directly to a movable component of the actuator and has an electrical conductivity that exceeds an electrical conductivity of the movable component to which the conductive target is coupled.

In some embodiments, the conductive target includes a first end having a first width, a second end having a second width greater than the first width, and a middle portion extending between the first end and the second end. The middle portion may have a width that increases gradually from the first width to the second width.

In some embodiments, each of the multiple different portions of the conductive target has a different area. The inductance of each portion of the conductive target may be proportional to the area of the portion.

Another implementation of the present disclosure is an actuator. The actuator includes an inductive sensor, a conductive target, and a controller. The conductive target has multiple different portions that become aligned with the inductive sensor as a position of the actuator changes. Each of the multiple different portions having a different inductance. The controller receives a signal from the inductive sensor indicating an observed inductance of the portion of the conductive target aligned with the inductive sensor. The controller uses a stored relationship between the observed inductance and the position of the actuator to determine the position of the actuator based on the observed inductance. The controller operates the actuator to change the position of the actuator based on the determined position.

In some embodiments, the actuator is a rotary actuator including a sector gear that rotates as the position of the actuator changes. The conductive target may be coupled to the sector gear and may move along with the sector gear.

In some embodiments, the actuator is a linear actuator including a linear component that moves along a linear range of motion as position of the actuator changes. The conductive target may be coupled to the linear component and may move along with the linear component.

In some embodiments, the conductive target is coupled directly to a movable component of the actuator and has an electrical conductivity that exceeds an electrical conductivity of the movable component to which the conductive target is coupled.

In some embodiments, the conductive target includes a first end having a first width, a second end having a second width greater than the first width, and a middle portion extending between the first end and the second end. The middle portion may have a width that increases gradually from the first width to the second width.

In some embodiments, each of the multiple different portions of the conductive target has a different area. The inductance of each portion of the conductive target may be proportional to the area of the portion.

Another implementation of the present disclosure is a method for controlling a HVAC actuator. The actuator includes a motor, a drive device driven by the motor and coupled to a movable HVAC component, an inductive sensor, and a conductive target. The method includes using the inductive sensor to observe an inductance of a portion of the conductive target aligned with the inductive sensor. Multiple different portions of the conductive target become aligned with the inductive sensor as the movable HVAC component is driven between multiple positions. Each of the multiple different portions has a different inductance. The method includes using a stored relationship between the observed inductance and a position of the drive device to determine the position of the drive device based on the observed inductance. The method includes operating the motor to change a position of the movable HVAC component based on the determined position.

In some embodiments, observing the inductance of the portion of the conductive target aligned with the inductive sensor includes delivering an AC current through an inductor integrated with the inductive sensor and emitting a first magnetic field from the inductive sensor as a result of delivering the AC current through the inductor. The first magnetic field may cause Eddy currents in the conductive target. Observing the inductance may further include sensing a second magnetic field caused by the Eddy currents in the conductive target. A strength of the second magnetic field may be proportional to an inductance of the portion of the conductive target aligned with the inductive sensor.

In some embodiments, the actuator is a rotary actuator including a sector gear that rotates as the movable HVAC component is driven between the multiple positions. The conductive target may be coupled to the sector gear and may move along with the sector gear.

In some embodiments, the actuator is a linear actuator including a linear component that moves along a linear range of motion as the movable HVAC component is driven between the multiple positions. The conductive target may be coupled to the linear component and may move along with the linear component.

In some embodiments, the conductive target is coupled directly to a movable component of the actuator and has an electrical conductivity that exceeds an electrical conductivity of the movable component to which the conductive target is coupled.

In some embodiments, conductive target includes a first end having a first width, a second end having a second width greater than the first width, and a middle portion extending between the first end and the second end. The middle portion may have a width that increases gradually from the first width to the second width.

In some embodiments, each of the multiple different portions of the conductive target has a different area. The inductance of each portion of the conductive target may be proportional to the area of the portion.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIGS. 5-7 are drawings of an actuator which may be used in the HVAC system of FIG. 1, the waterside system of FIG. 2, the airside system of FIG. 3, or the BMS of FIG. 4 to control a HVAC component, according to an exemplary embodiment.

DETAILED DESCRIPTION

Referring generally to the FIGURES, a HVAC actuator with inductive position sensing is shown, according to an exemplary embodiment. The actuator may be a damper actuator, a valve actuator, a fan actuator, a pump actuator, or any other type of actuator that can be used in a HVAC system.

The actuator includes a motor and a drive device driven by the motor. In some embodiments, the motor is a brushless direct current (BLDC) motor. The drive device may be coupled to a movable HVAC component for driving the movable HVAC component between multiple positions.

The actuator further includes a conductive target and an inductive sensor. The conductive target may be coupled to the drive device such that a portion of the conductive target aligns with the inductive sensor. As the movable HVAC component is driven between positions, multiple different portions or segments of the conductive target become aligned with the inductive sensor. Each portion or segment of the conductive target has a different inductance. The inductive sensor senses the inductance of the portion of the conductive target aligned with the inductive sensor.

The actuator further includes a controller. The controller receives a signal from the inductive sensor indicating an observed inductance of the portion of the conductive target aligned with the inductive sensor. The controller uses a stored relationship between the observed inductance and a position of the drive device to determine the position of the drive device based on the observed inductance. The controller operates the motor to change a position of the movable HVAC component based on the determined position.

Advantageously, the inductive sensing allows the controller to determine the absolute position of the actuator, even if the actuator position has changed while the actuator is in an unpowered state. Unlike potentiometers, the inductive sensor can operate at a distance, thereby avoiding physical wear and degradation of the sensing components. Additional features and advantages of the present invention are described in greater detail below.

Building Management System and HVAC System

Figure 1:
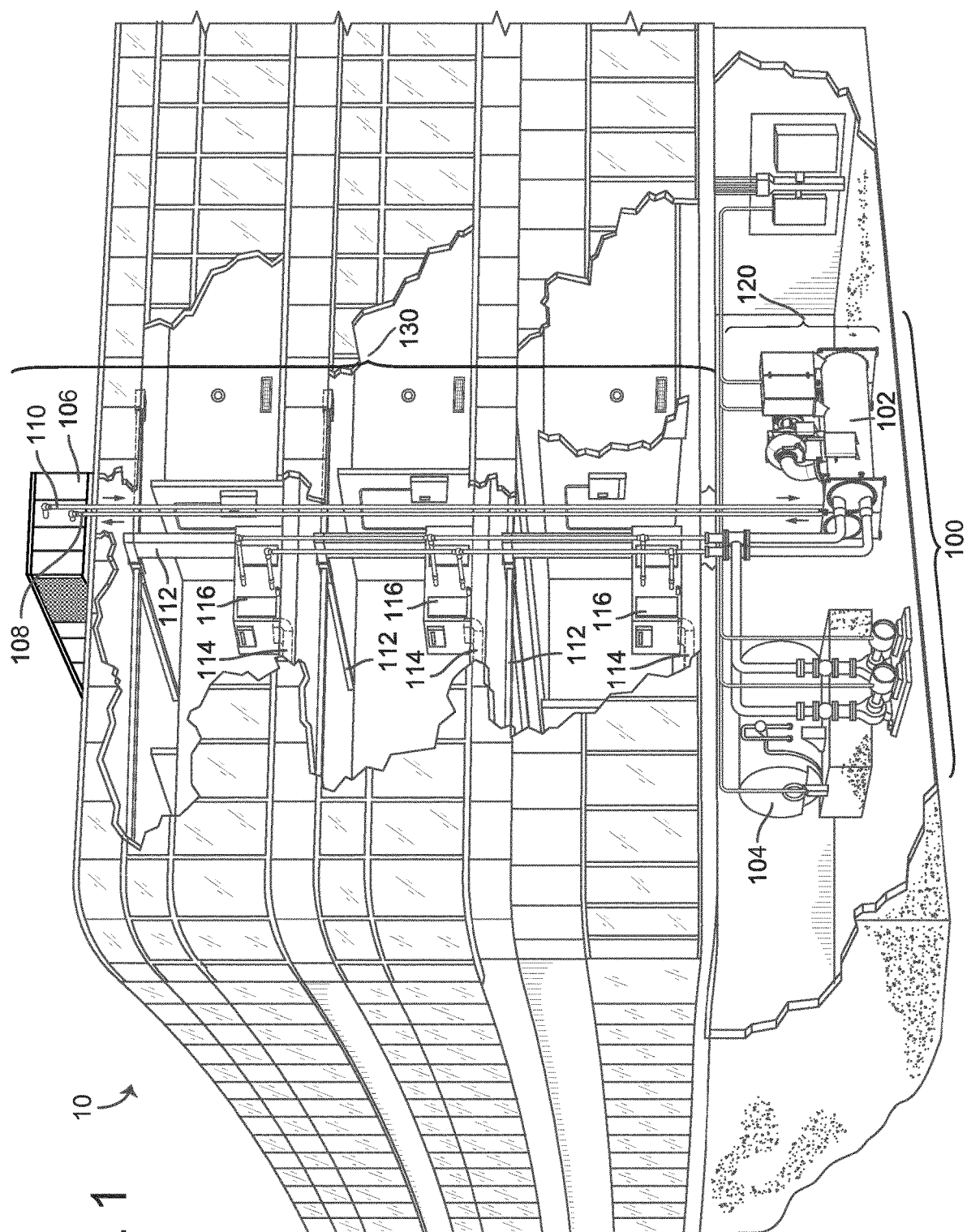
FIG. 1 is a drawing of a building equipped with a heating, ventilating, or air conditioning (HVAC) system and a building management system (BMS), according to an exemplary embodiment.

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
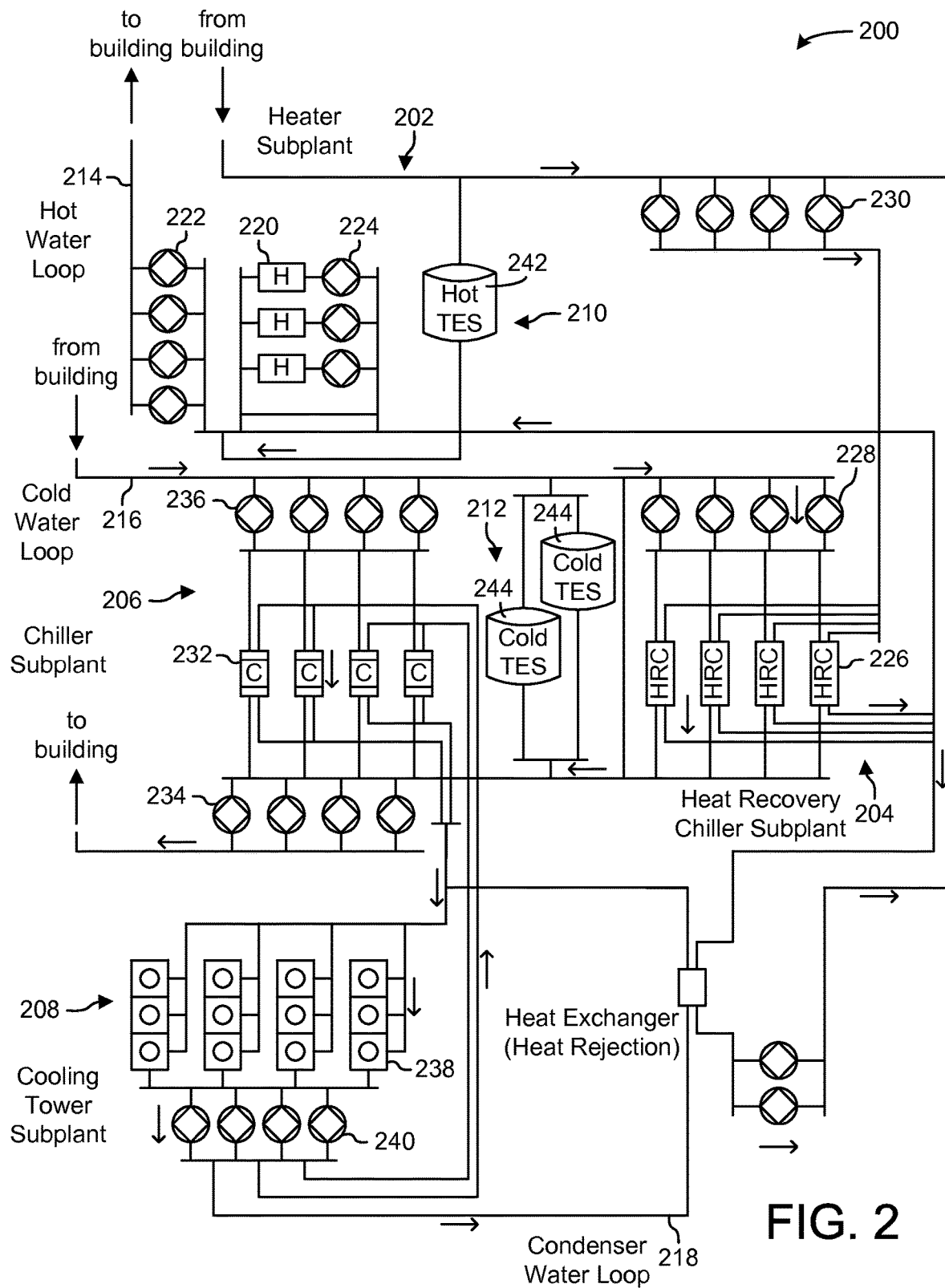
FIG. 2 is a schematic diagram of a waterside system which may be used to support the HVAC system of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
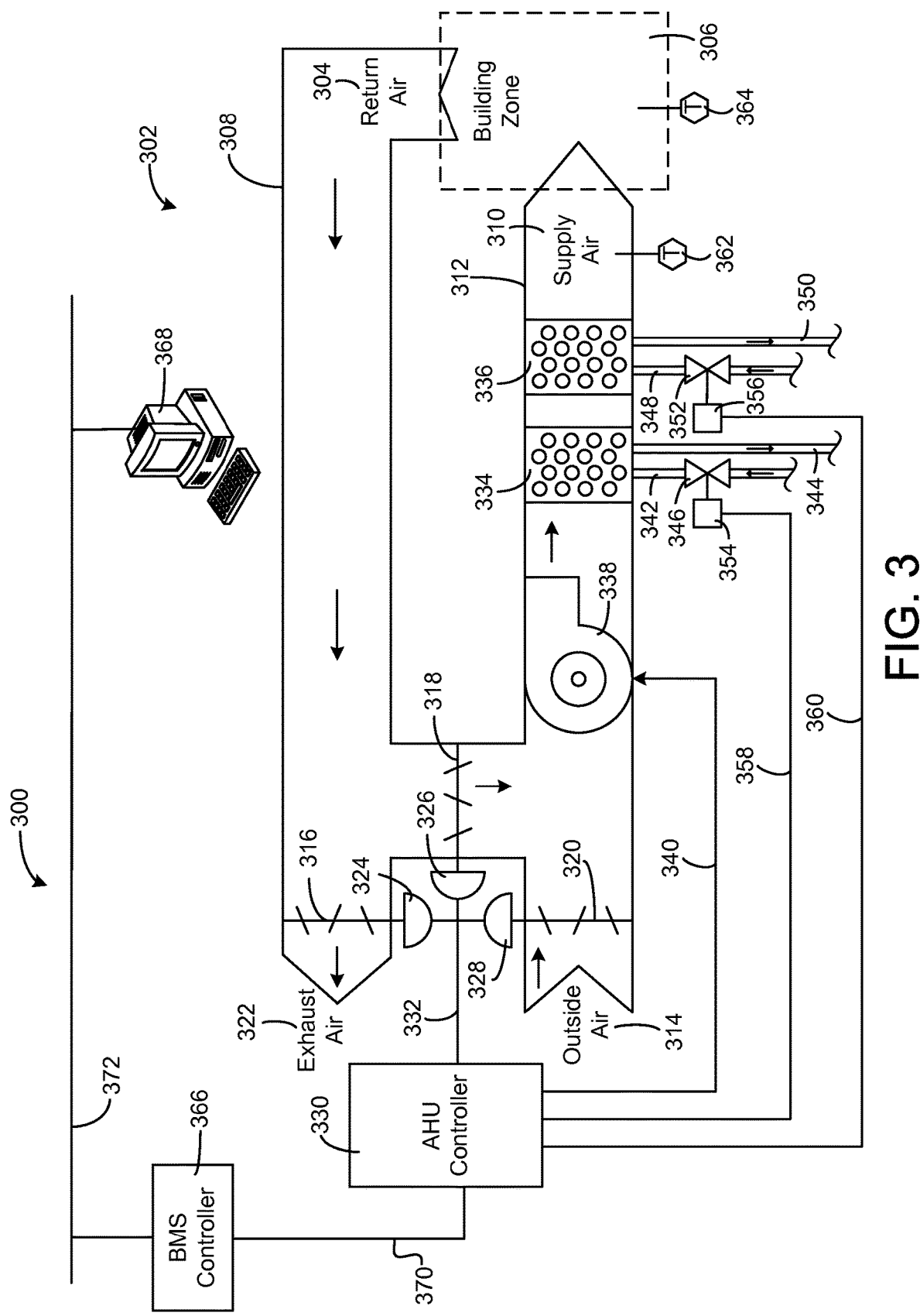
FIG. 3 is a block diagram of an airside system which may be used as part of the HVAC system of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
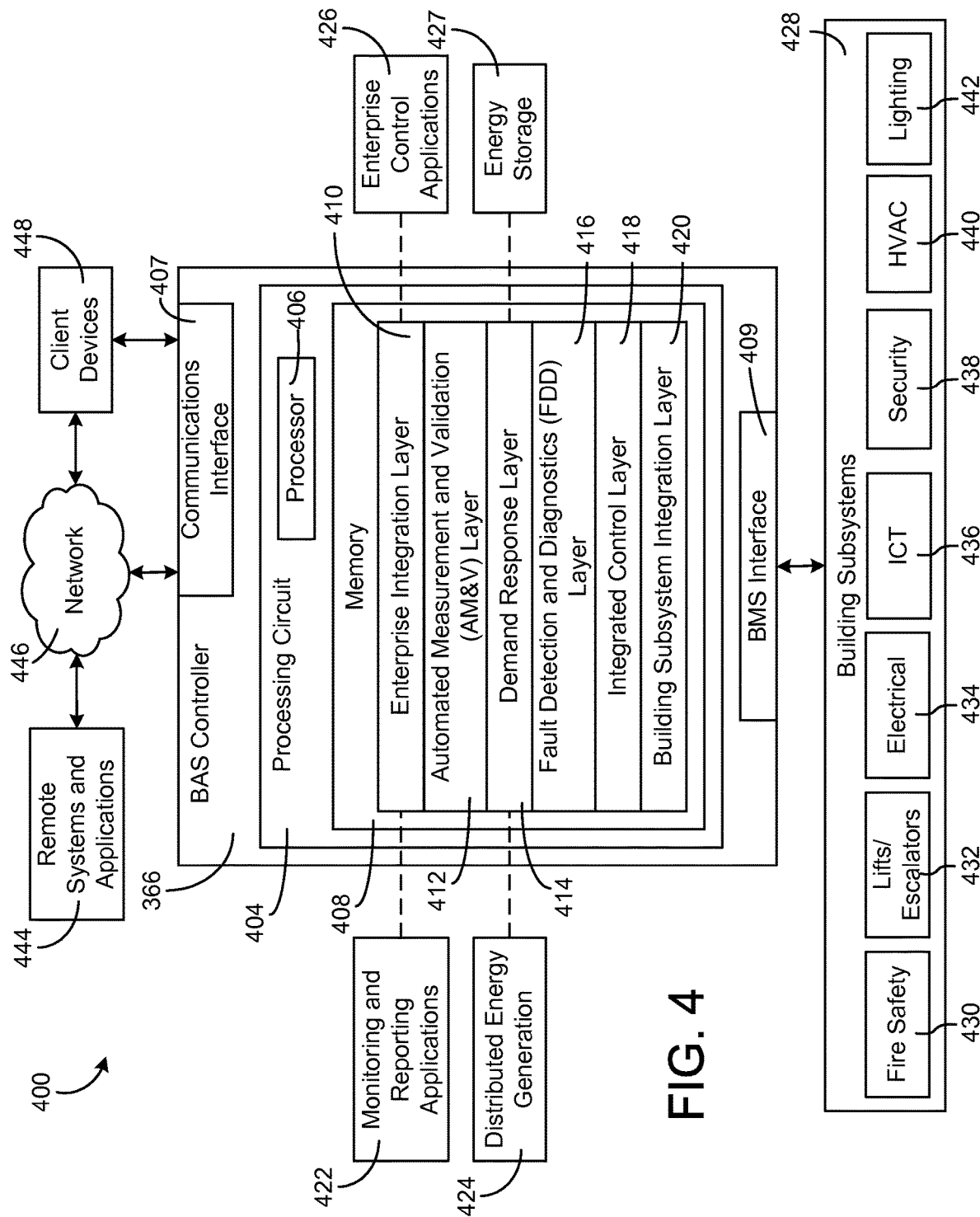
FIG. 4 is a block diagram of a BMS which may be implemented in the building of FIG. 1, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430.

In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428.

Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

HVAC Actuator

Figure 5:
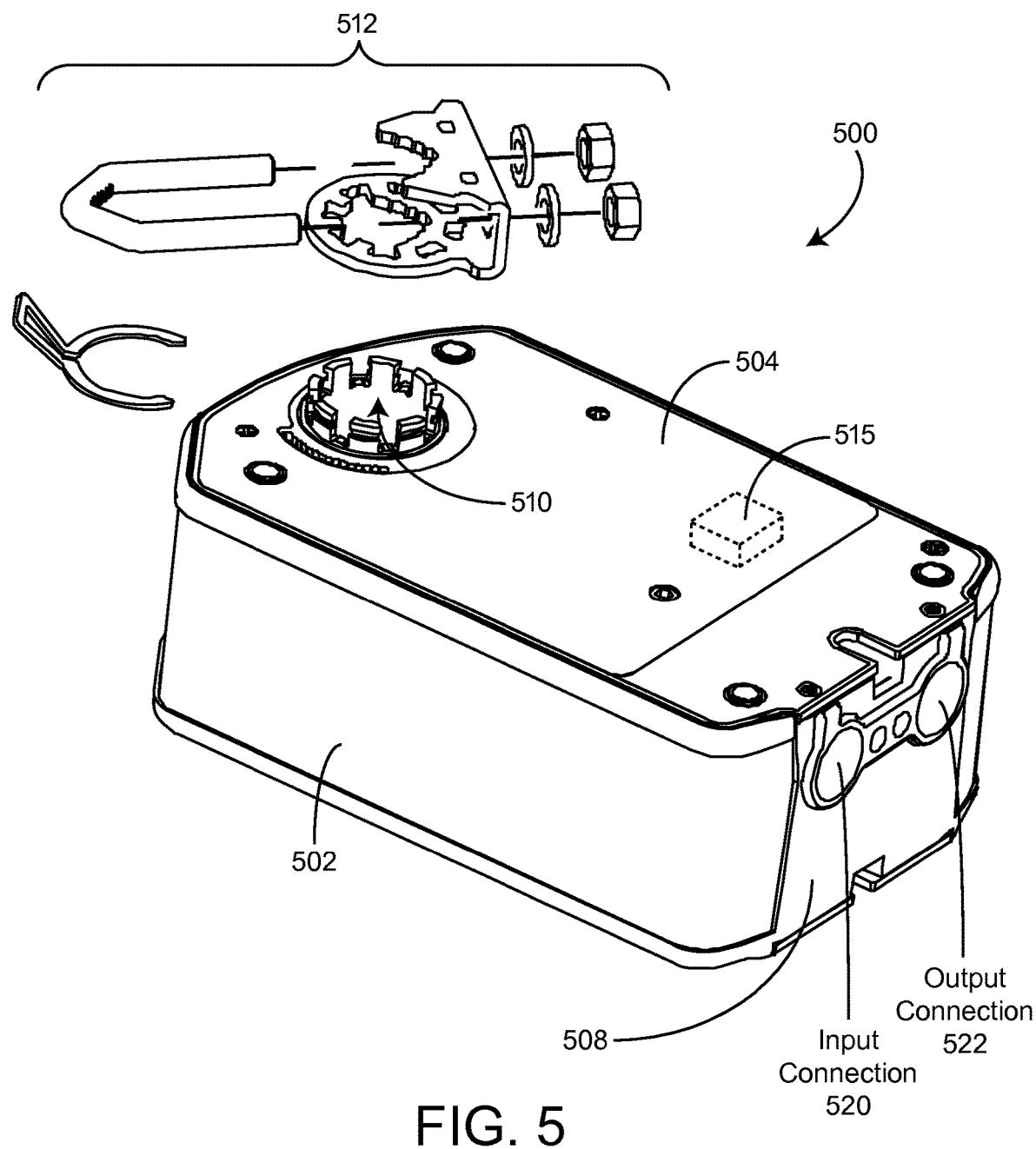

Referring now to FIGS. 5-7, an actuator 500 for use in a HVAC system is shown, according to an exemplary embodiment. In some implementations, actuator 500 may be used in HVAC system 100, waterside system 200, airside system 300, or BMS 400, as described with reference to FIGS. 1-4. For example, actuator 500 may be a damper actuator, a valve actuator, a fan actuator, a pump actuator, or any other type of actuator that can be used in a HVAC system or BMS. In various embodiments, actuator 500 may be a linear actuator (e.g., a linear proportional actuator), a non-linear actuator, a spring return actuator, or a non-spring return actuator.

Actuator 500 is shown to include a housing 502 having a front side 504 (i.e., side A), a rear side 506 (i.e., side B) opposite front side 504, and a bottom 508. Housing 502 may contain the mechanical and processing components of actuator 500. In some embodiments, housing 502 contains a brushless direct current (BLDC) motor and a processing circuit configured to provide a pulse width modulated (PWM) DC output to control the speed of the BLDC motor. The processing circuit may be configured to compare a representation of the electric current output to the BLDC motor to a threshold and may hold the PWM DC output in an off state when the current exceeds the threshold. In some embodiments, the processing circuit is configured to set the PWM DC output to zero and then ramp up the PWM DC output when actuator 500 approaches an end stop. In some embodiments, the processing circuit is coupled to one or more inductive sensors configured to measure the position of actuator 500. The internal components of actuator 500 are described in greater detail with reference to FIGS. 8-10.

Actuator 500 is shown to include a drive device 510. Drive device 510 may be a drive mechanism, a hub, or other device configured to drive or effectuate movement of a HVAC system component. For example, drive device 510 may be configured to receive a shaft of a damper, a valve, or any other movable HVAC system component in order to drive (e.g., rotate) the shaft. In some embodiments, actuator 500 includes a coupling device 512 configured to aid in coupling drive device 510 to the movable HVAC system component. For example, coupling device 512 may facilitate attaching drive device 510 to a valve or damper shaft.

Actuator 500 is shown to include an input connection 520 and an output connection 522. In some embodiments, input connection 520 and output connection 522 are located along bottom 508. In other embodiments, input connection 520 and output connection 522 may be located along one or more other surfaces of housing 502. Input connection 520 may be configured to receive a control signal (e.g., a voltage input signal) from an external system or device. Actuator 500 may use the control signal to determine an appropriate PWM DC output for the BLDC motor. In some embodiments, the control signal is received from a controller such as an AHU controller (e.g., AHU controller 330), an economizer controller, a supervisory controller (e.g., BMS controller 366), a zone controller, a field controller, an enterprise level controller, a motor controller, an equipment-level controller (e.g., an actuator controller) or any other type of controller that can be used in a HVAC system or BMS.

In some embodiments, the control signal is a DC voltage signal. Actuator 500 may be a linear proportional actuator configured to control the position of drive device 510 according to the value of the DC voltage received at input connection 520. For example, a minimum input voltage (e.g., 0.0 VDC) may correspond to a minimum rotational position of drive device 510 (e.g., 0 degrees, −5 degrees, etc.), whereas a maximum input voltage (e.g., 10.0 VDC) may correspond to a maximum rotational position of drive device 510 (e.g., 90 degrees, 95 degrees, etc.). Input voltages between the minimum and maximum input voltages may cause actuator 500 to move drive device 510 into an intermediate position between the minimum rotational position and the maximum rotational position. In other embodiments, actuator 500 may be a non-linear actuator or may use different input voltage ranges or a different type of input signal (e.g., AC voltage or current) to control the position and/or rotational speed of drive device 510.

In some embodiments, the control signal is an AC voltage signal. Input connection 520 may be configured to receive an AC voltage signal having a standard power line voltage (e.g., 120 VAC or 230 VAC at 50/60 Hz). The frequency of the voltage signal may be modulated (e.g., by a controller for actuator 500) to adjust the rotational position and/or speed of drive device 510. In some embodiments, actuator 500 uses the voltage signal to power various components of actuator 500. Actuator 500 may use the AC voltage signal received via input connection 520 as a control signal, a source of electric power, or both. In some embodiments, the voltage signal is received at input connection 520 from a power supply line that provides actuator 500 with an AC voltage having a constant or substantially constant frequency (e.g., 120 VAC or 230 VAC at 50 Hz or 60 Hz). Input connection 520 may include one or more data connections (separate from the power supply line) through which actuator 500 receives control signals from a controller or another actuator (e.g., 0-10 VDC control signals).

In some embodiments, the control signal is received at input connection 520 from another actuator. For example, if multiple actuators are interconnected in a tandem arrangement, input connection 520 may be connected (e.g., via a communications bus) to the output data connection of another actuator. One of the actuators may be arranged as a master actuator with its input connection 520 connected to a controller, whereas the other actuators may be arranged as slave actuators with their respective input connections connected to the output connection 522 of the master actuator.

Output connection 522 may be configured to provide a feedback signal to a controller of the HVAC system or BMS in which actuator 500 is implemented (e.g., an AHU controller, an economizer controller, a supervisory controller, a zone controller, a field controller, an enterprise level controller, etc.). The feedback signal may indicate the rotational position and/or speed of actuator 500. In some embodiments, output connection 522 may be configured to provide a control signal to another actuator (e.g., a slave actuator) arranged in tandem with actuator 500. Input connection 520 and output connection 522 may be connected to the controller or the other actuator via a communications bus. The communications bus may be a wired or wireless communications link and may use any of a variety of disparate communications protocols (e.g., BACnet, LON, WiFi, Bluetooth, NFC, TCP/IP, etc.).

Still referring to FIGS. 5-7, actuator 500 is shown to include a first user-operable switch 514 located along front side 504 (shown in FIG. 6) and a second user-operable switch 516 located along rear side 506 (shown in FIG. 7). Switches 514-516 may be potentiometers or any other type of switch (e.g., push button switches such as switch 515, dials, flippable switches, etc.). Switches 514-516 may be used to set actuator 500 to a particular operating mode or to configure actuator 500 to accept a particular type of input. However, it should be understood that switches 514-516 are optional components and are not required for actuator 500 to perform the processes described herein. As such, one or more of switches 514-516 may be omitted without departing from the teachings of the present invention.

Referring particularly to FIG. 6, switch 514 may be a mode selection switch having a distinct number of modes or positions. Switch 514 may be provided for embodiments in which actuator 500 is a linear proportional actuator that controls the position of drive device 510 as a function of a DC input voltage received at input connection 520. In some embodiments, the function of mode selection switch 514 is the same or similar to the function of the mode selection switch described in f. For example, the position of mode selection switch 514 may be adjusted to set actuator 500 to operate in a direct acting mode, a reverse acting mode, or a calibration mode.

Mode selection switch 514 is shown to include a 0-10 direct acting (DA) mode, a 2-10 DA mode, a calibration (CAL) mode, a 2-10 reverse acting (RA) mode, and a 0-10 RA mode. According to other exemplary embodiments, mode selection switch 514 may have a greater or smaller number of modes and/or may have modes other than listed as above. The position of mode selection switch 514 may define the range of DC input voltages that correspond to the rotational range of drive device 510. For example, when mode selection switch 514 is set to 0-10 DA, an input voltage of 0.0 VDC may correspond to 0 degrees of rotation position for drive device 510. For this same mode, an input voltage of 1.7 VDC may correspond to 15 degrees of rotation position, 3.3 VDC may correspond to 30 degrees of rotation position, 5.0 VDC may correspond to 45 degrees of rotation position, 6.7 VDC may correspond to 60 degrees of rotation position, 8.3 VDC may correspond to 75 degrees of rotation position, and 10.0 VDC may correspond to 90 degrees of rotation position. It should be understood that these voltages and corresponding rotational positions are merely exemplary and may be different in various implementations.

Referring particularly to FIG. 7, switch 516 may be a mode selection switch having a distinct number or modes or positions. Switch 516 may be provided for embodiments in which actuator 500 is configured to accept an AC voltage at input connection 520. In some embodiments, the function of mode selection switch 516 is the same or similar to the function of the mode selection switch described in U.S. patent application Ser. No. 14/475,141, filed Sep. 1, 2014, the entire disclosure of which is incorporated by reference herein. For example, the position of switch 516 may be adjusted to set actuator 500 to accept various different AC voltages at input connection 520.

Mode selection switch 516 is shown to include a "24 VAC" position, a "120 VAC" position, a "230 VAC" position, an "Auto" position. Each position of switch 516 may correspond to a different operating mode. According to other exemplary embodiments, switch 516 may have a greater or lesser number of positions and/or may have modes other than the modes explicitly listed. The different operating modes indicated by switch 516 may correspond to different voltage reduction factors applied to the input voltage received at input connection 520. For example, with switch 516 in the 24 VAC position, actuator 500 may be configured to accept an input voltage of approximately 24 VAC (e.g., 20-30 VAC) at input connection 520 and may apply a reduction factor of approximately 1 to the input voltage. With switch 516 in the 120 VAC position, actuator 500 may be configured to accept an input voltage of approximately 120 VAC (e.g., 100-140 VAC, 110-130 VAC, etc.) at input connection 520 and may apply a reduction factor of approximately 5 (e.g., 3-7, 4-6, 4.5-5.5, etc.) to the input voltage. With switch 516 in the 230 VAC position, actuator 500 may be configured to accept an input voltage of approximately 230 VAC (e.g., 200-260 VAC, 220-240 VAC, etc.) at input connection 520 and may apply a reduction factor of approximately 9.6 (e.g., 7-13, 8-12, 9-10, etc.) to the input voltage. With switch 516 in the "Auto" position, actuator 500 may be configured automatically determine the input voltage received at input connection 520 and may adjust the voltage reduction factor accordingly.

Inductive Position Sensing

Figure 9:
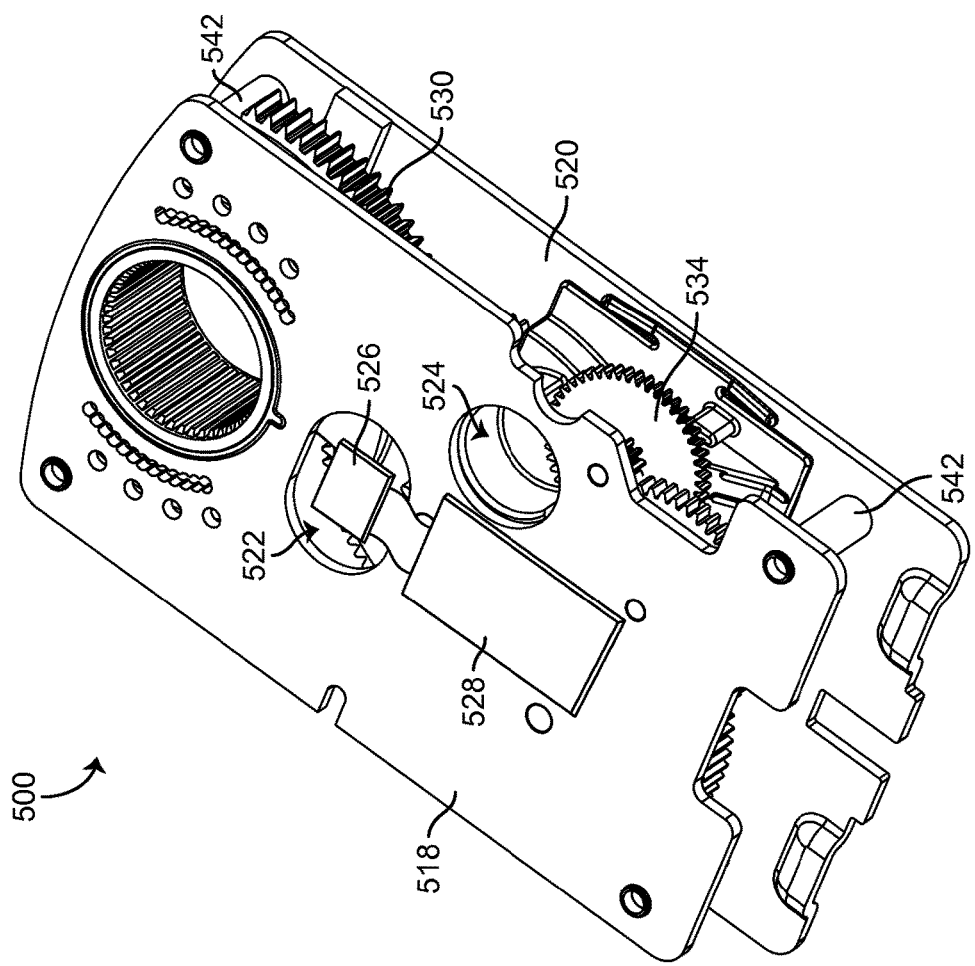
FIGS. 8-10 are drawings of the actuator of FIGS. 5-7 with the housing removed to show internal components of the actuator, according to an exemplary embodiment.
Figure 8:
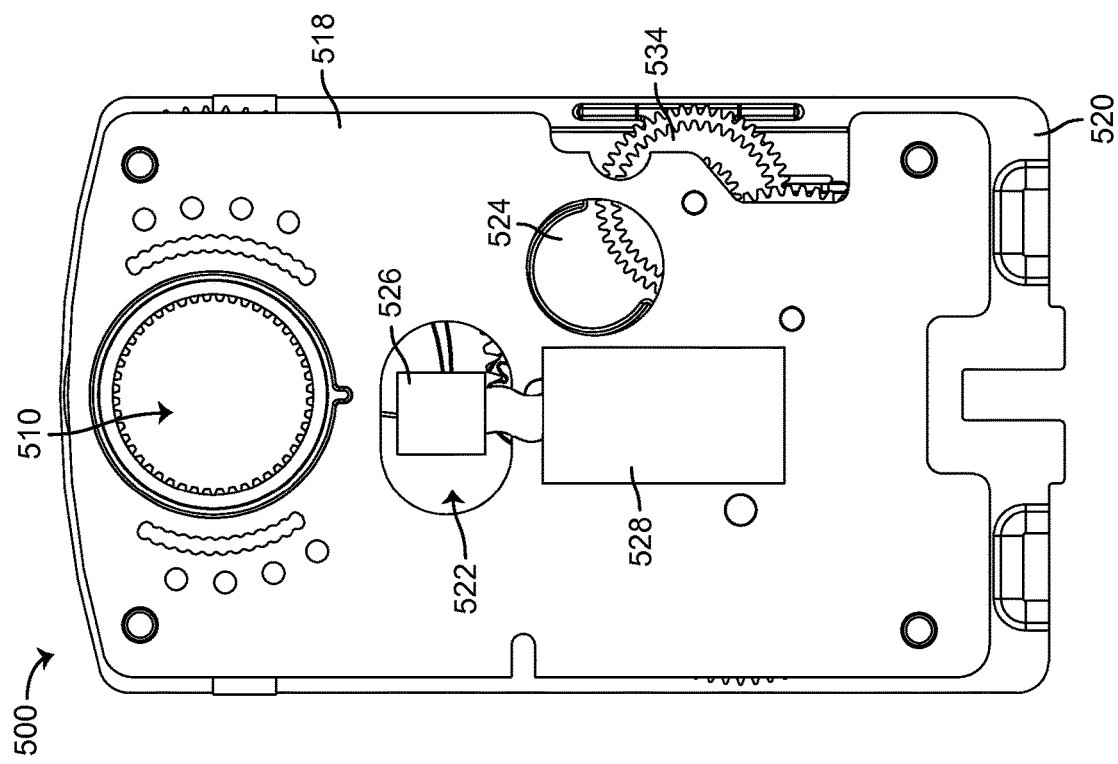
Figure 10:
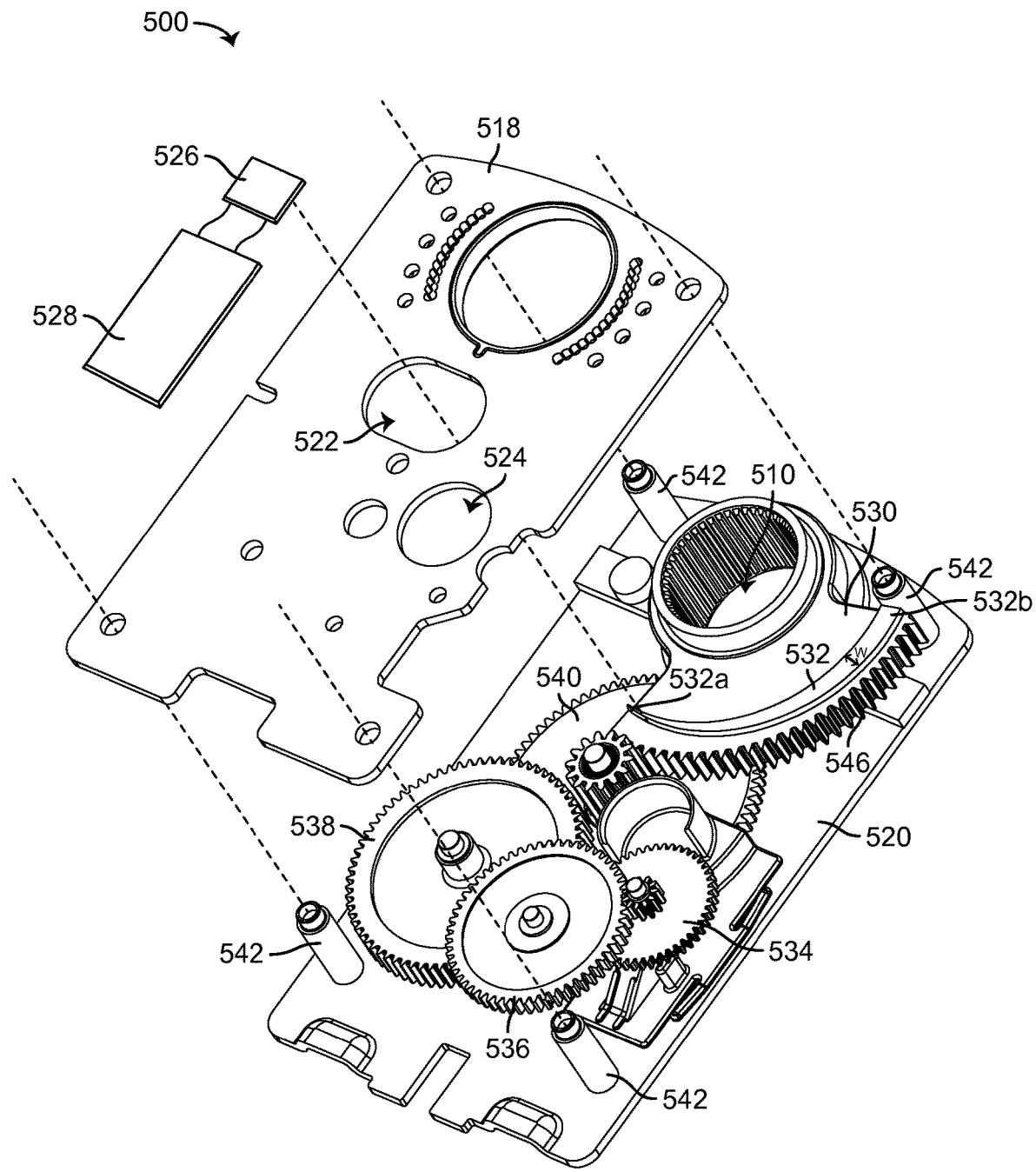

Referring now to FIGS. 8-10, several views of actuator 500 with housing 502 removed are shown, according to an exemplary embodiment. Actuator 500 is shown to include a front plate 518 and a rear plate 520 separated by spacers 542. A system of gears (e.g., a gear train, a gear box, etc.) is shown between front plate 518 and rear plate 520. The system of gears is shown to include a sector gear 530 and several other gears 534-540. A gear shaft of a motor (not shown) may be inserted through opening 524 in front plate 518 such that the motor is directly coupled to gear 534. Rotation of the motor may be translated to sector gear 530 via gears 534-540. In some embodiments, gears 534-540 are arranged such that sector gear 530 has a reduced gear ratio relative to the motor. In other words, sector gear 530 may rotate at a reduced rate relative to the gear shaft of the motor. Sector gear 530 may be coupled to drive device 510 as shown in FIG. 10.

Actuator 500 is shown to include an inductive sensor 526 and a controller 528. Inductive sensor 526 may include an integrated inductor (i.e., a conductive coil configured to carry an electric current). An inductor (also called a coil, choke, or reactor) is a passive two-terminal electrical component which resists changes in electric current passing through it. Controller 528 delivers an AC current through inductive sensor 526, which causes inductive sensor 526 to generate an AC magnetic field. The AC magnetic field creates a changing magnetic flux through the inductor, which induces a voltage across the inductor according to Faraday's law of electromagnetic induction. Several exemplary coil patterns which may be used to form the inductor are described in greater detail with reference to FIGS. 11-16.

Inductive sensor 526 may be positioned over an opening 522 in front plate 518 such that inductive sensor 526 aligns with a conductive target 532 on the surface of sector gear 530. In some embodiments, inductive sensor 526 is fixed relative to front plate 518 and conductive target 532 moves relative to inductive sensor 526 as sector gear 530 rotates. Conductive target 532 may be made of an electrically-conductive material (e.g., a metal, a conductive ink, a conductive trace, etc.). In some embodiments, conductive target 532 has a greater electrical conductivity than the material used to form sector gear 530. For example, sector gear 530 may be made of carbon steel or stainless steel, whereas conductive target 532 may be made of copper, nickel, zinc, silver, or any other material having a high electrical conductivity (relative to sector gear 530). In other embodiments, conductive target 532 has a lesser electrical conductivity than the material used to form sector gear 530. Conductive target 532 is shown as an extrusion from the front surface of sector gear 530. However, it is contemplated that conductive target 532 may be recessed into the front surface of sector gear 530 and/or aligned with the front surface of sector gear 530 in various alternative embodiments.

As shown in FIG. 10, conductive target 532 may extend along a portion of sector gear 530, adjacent to gear teeth 546. In some embodiments, conductive target 532 has an arcuate shape which substantially corresponds to the curvature of sector gear 530. For example, conductive target 532 is shown to include a first end 532a, a second end 532b, and an arcuate middle portion extending between first end 532a and second end 532b. In some embodiments, the arc length of conductive target 532 is substantially equal to the rotational range of drive device 510 and/or sector gear 530. For example, if actuator 500 is configured to rotate drive device 510 and/or sector gear by approximately 90 degrees, conductive target 532 may have an arc length of approximately 90 degrees. In various other embodiments, conductive target 532 may be located along any movable component of actuator 500 (e.g., sector gear 530, any of gears 534-540, drive device 510, etc.). The location of conductive target 532 is not limited to sector gear 530.

The length of conductive target 532 may exceed the footprint of inductive sensor 526 such that only a portion of conductive target 532 is aligned with inductive sensor 526 at any given time. As sector gear 530 rotates, different segments of conductive target 532 become aligned with inductive sensor 526. For example, conductive target 532 may move along with sector gear 530 between a first end position (shown in FIG. 17) in which first end 532a is substantially aligned with inductive sensor 526 and a second end position (shown in FIG. 18) in which second end 532b is substantially aligned with inductive sensor 526.

Figure 17:
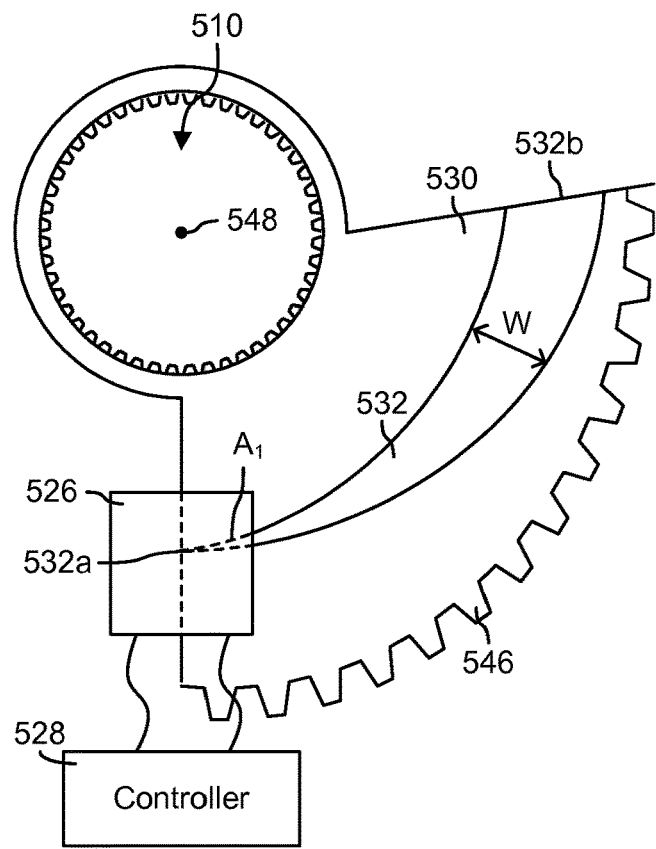
FIG. 17 is a drawing of a portion a rotary actuator having a sector gear and a conductive target coupled to the sector gear when the sector gear is in a minimum inductance position relative to the inductive sensor, according to an exemplary embodiment.
Figure 18:
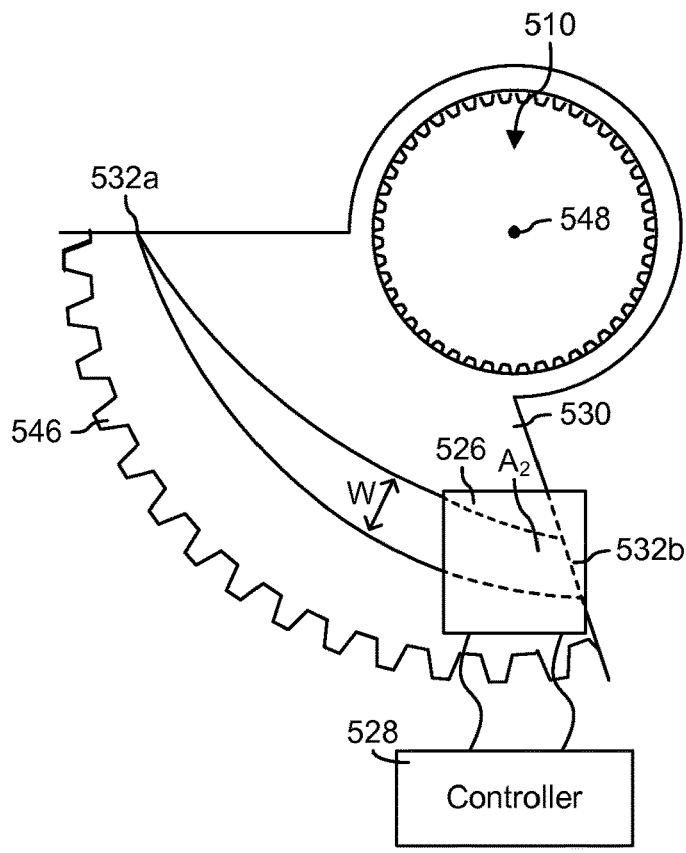
FIG. 18 is a drawing of the rotary actuator of FIG. 17 when the sector gear is in a maximum inductance position relative to the inductive sensor, according to an exemplary embodiment.

The width w of conductive target 532 increases gradually from first end 532a to second end 532b. Accordingly, the area of conductive target 532 aligned with inductive sensor 526 varies as sector gear 530 rotates. For example, FIG. 17 shows sector gear 530 in a first end position in which a minimum area of conductive target 532 is aligned with inductive sensor 526, whereas FIG. 18 shows sector gear 530 in a second end position in which a maximum area of conductive target 532 is aligned with inductive sensor 526.

As previously noted, controller 528 causes an AC electric current to pass through inductive sensor 526, which causes an AC magnetic field to be emitted from the front surface of inductive sensor 526. The AC magnetic field is oriented in a direction substantially perpendicular to the front surface of inductive sensor 526 (i.e., the surface visible in FIG. 8) and passes through the portion of conductive target 532 aligned with inductive sensor 526. The AC magnetic field induces circulating currents (i.e., Eddy currents) on the surface of conductive target 532.

The magnitude of the induced Eddy currents is a function of several factors including the area of conductive target 532 aligned with inductive sensor 526. For example, when sector gear 530 is in the position shown in FIG. 17, a relatively small area of conductive target 532 is aligned with inductive sensor 526 and the induced Eddy currents have a relatively small magnitude. Conversely, when sector gear 530 is in the position shown in FIG. 18, a relatively large area of conductive target 532 is aligned with inductive sensor 526 and the induced Eddy currents have a relatively large magnitude. The induced Eddy currents generate their own magnetic field, which opposes the original magnetic field generated by the electric current flowing through inductive sensor 526.

This mechanism is analogous to the operation of a transformer, where the inductor coil within inductive sensor 526 is the primary core and conductive target 532 is the secondary core. The inductive coupling between inductive sensor 526 (the primary core) and conductive target 532 (the secondary core) depends on the area of conductive target 532 aligned with inductive sensor 526. Therefore, the resistance and inductance of conductive target 532 can be viewed as distant resistive and inductive components on the side of the inductive sensor 526. The magnitudes of the resistance and inductance provided by conductive target 532 depend on the area of conductive target 532 aligned with inductive sensor 526, which varies as a function of the position of drive device 510 and/or sector gear 530. Advantageously, this relationship allows the position of drive device 510 (and the position of the attached HVAC component) to be determined by measuring the inductance and/or resistance provided by conductive target 532 (described in greater detail with reference to FIGS. 21-24).

Inductor Coil Patterns

Figure 11:
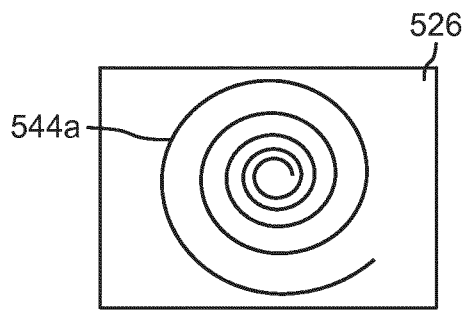
FIGS. 11-16 are drawings of several inductor coil patterns which may be used as part of an inductive sensor of the actuator of FIGS. 5-7, according to an exemplary embodiment.

Referring now to FIGS. 11-16, several coil patterns which may be used to form the inductor integrated with inductive sensor 526 are shown, according to various exemplary embodiments. FIG. 11 shows a first inductor pattern in which coils 544a are arranged in a spiral pattern. The inductor shape is an important characteristic of the inductor because it determines the shape of the generated magnetic field. A circular spiral shape generates a more symmetrical magnetic field than other shapes and may be used to minimize resistive losses within inductive sensor 526. Accordingly, it may be advantageous to use the spiral pattern shown in FIG. 11 unless design considerations warrant using an alternative shape.

Figure 12:
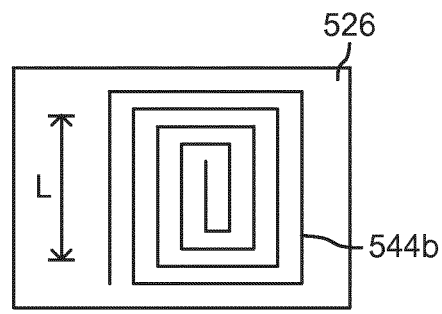

FIG. 12 shows a second inductor pattern in which coils 544b are arranged in rectangular loops with a distance L between innermost loops. Rectangular loops may be sensitive to movement along a first direction (i.e., left and right in FIG. 12) but insensitive to movement along a second direction (i.e., up and down in FIG. 12). For example, horizontal movement of conductive target 532 may increase or decrease the area of conductive target 532 aligned with coils 544b, whereas vertical movement of conductor 532 within distance L may not change the area of conductive target 532 aligned with coils 544b. This allows the rectangular pattern shown in FIG. 12 to measure a change in actuator position along a first direction (e.g., the direction of actuation) without being influenced by incidental movement along a second direction.

Figure 13:
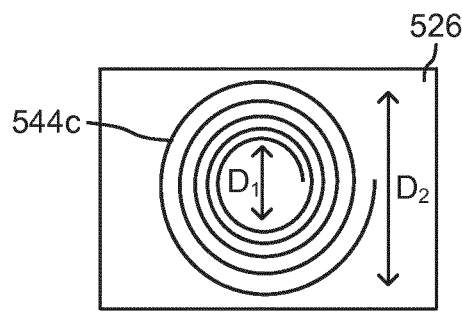

FIG. 13 shows a third inductor pattern in which coils 544c are arranged in a partial spiral pattern having an inner diameter $D_1$ and an outer diameter $D_2$. The pattern shown in FIG. 13 is substantially similar to the pattern shown in FIG. 11, with the exception that the inner diameter defined by distance $D_1$ is not occupied by inductor loops. This allows the partial pattern to be sensitive to movement along a first direction (i.e., left and right in FIG. 13) but insensitive to movement along a second direction (i.e., up and down in FIG. 13) as long as the magnitude of the movement along the second direction does not exceed the inner diameter $D_1$.

Figure 14:
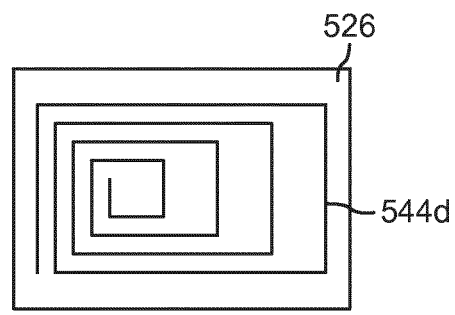

FIG. 14 shows a fourth inductor pattern in which coils 544d are arranged in a rectangular pattern stretched along one side. The density of coils 544d is significantly greater along the left side of coils 544d than along the right side of coils 544d. The pattern shown in FIG. 14 may allow inductive sensor 526 to produce a linear flux density gradient as conductive target 532 moves horizontally (i.e., left and right in FIG. 14) across coils 544d. The ratio of the distance between adjacent tightly-packed coils to the distance between adjacent loosely-packed coils may correspond to the ratio of the width w of conductive target 532 below the loosely-packed coils to the width w of conductive target 532 below the tightly-packed coils. This results in the flux density increasing linearly as conductive target 532 moves from right to left across coils 544d.

Figure 15:
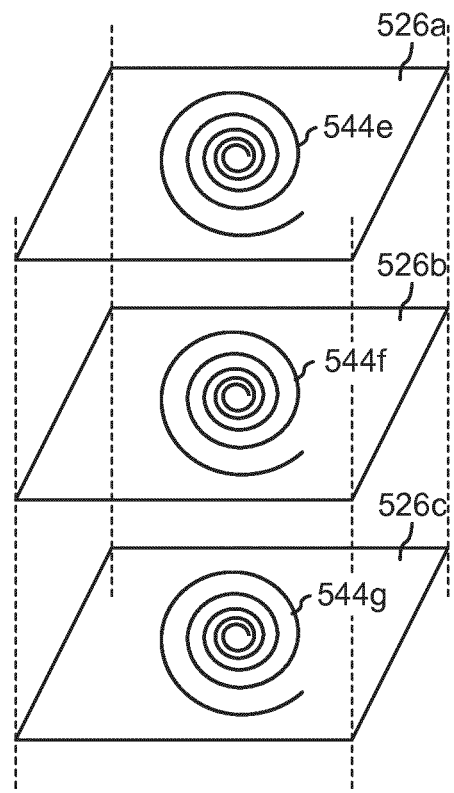

FIG. 15 shows a fifth inductor pattern in which inductive sensor 526 includes multiple layers 526a, 526b, and 526c. A first coil 544e is arranged in a spiral pattern along first layer 526a, a second coil 544f is arranged in a spiral pattern along second layer 526b, and a third coil 544g is arranged in a spiral pattern along third layer 526c. The coils 544e-555g overlap with each other, thereby increasing the total inductance of inductive sensor 526. The arrangement shown in FIG. 15 may be used to increase the inductance of inductive sensor 526 without requiring the coils to be packed tighter within a single layer.

Figure 16:
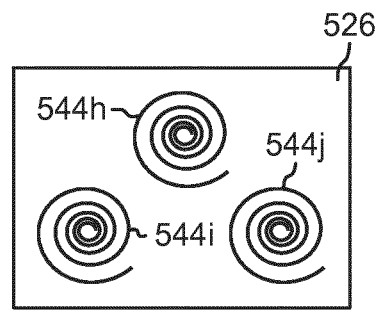

FIG. 16 shows a sixth inductor pattern in which inductive sensor 526 includes multiple coils 544h, 544i, and 544j arranged adjacent to each other along the same plane or layer of inductive sensor 526. Each of coils 544h-544j may measure a separate inductance. Advantageously, this allows the pattern shown in FIG. 16 to distinguish between changes in inductance caused by movement in a first direction (e.g., left and right in FIG. 16) and changes in inductance caused by movement in a second direction (e.g., up and down in FIG. 16). It is contemplated that inductive sensor 526 may use any of the inductor patterns shown in FIGS. 11-16 or any other inductor pattern as may be suitable for various implementations.

Rotary and Linear Actuators

Referring now to FIGS. 17-20, several drawings illustrating how inductive sensing can be used to determine the position of both rotary and linear actuators are shown, according to an exemplary embodiment. FIGS. 17-18 show a sector gear 530 of a rotary actuator (e.g., actuator 500) coupled to a drive device 510. The teeth 546 of sector gear 530 are coupled to a gear system, which is driven by a motor. Operating the motor causes sector gear 530 to rotate about axis 548. As sector gear 530 rotates, different segments of conductive target 532 become aligned with inductive sensor 526. For example, conductive target 532 may move along with sector gear 530 between a first end position (shown in FIG. 17) in which first end 532a is substantially aligned with inductive sensor 526 and a second end position (shown in FIG. 18) in which second end 532b is substantially aligned with inductive sensor 526.

The width w of conductive target 532 increases gradually from first end 532a to second end 532b. Accordingly, the area of conductive target 532 aligned with inductive sensor 526 varies as sector gear 530 rotates. For example, FIG. 17 shows sector gear 530 in a first end position in which a minimum area $A_1$ of conductive target 532 is aligned with inductive sensor 526, whereas FIG. 18 shows sector gear 530 in a second end position in which a maximum area $A_2$ of conductive target 532 is aligned with inductive sensor 526.

Controller 528 causes an AC electric current to pass through inductive sensor 526, which causes an AC magnetic field to be emitted from the front surface of inductive sensor 526. The AC magnetic field is oriented in a direction substantially perpendicular to the front surface of inductive sensor 526 and passes through the portion of conductive target 532 aligned with inductive sensor 526. The AC magnetic field induces circulating currents (i.e., Eddy currents) on the surface of conductive target 532.

The magnitude of the induced Eddy currents is a function of several factors including the area of conductive target 532 aligned with inductive sensor 526. For example, when sector gear 530 is in the position shown in FIG. 17, the relatively small area $A_1$ is aligned with inductive sensor 526 and the induced Eddy currents have a relatively small magnitude. Conversely, when sector gear 530 is in the position shown in FIG. 18, the relatively larger area $A_2$ is aligned with inductive sensor 526 and the induced Eddy currents have a relatively large magnitude. The induced Eddy currents generate their own (induced) magnetic field, which opposes the original magnetic field generated by the electric current flowing through inductive sensor 526 and causes a shift in the observed inductance. For example, the observed inductance may have a minimum value (i.e., minimum inductance) when sector gear 530 is in the position shown in FIG. 17, and a maximum value (i.e., maximum inductance) when sector gear 530 is in the position shown in FIG. 19.

Controller 528 senses the observed inductance and determines a corresponding actuator position (e.g., a rotational position of drive device 510). Controller 528 may map observed inductance to actuator position using a mapping function, table, or any other type of stored relationship between inductance and actuator position. Controller 528 may use the actuator position in conjunction with a position setpoint to determine an appropriate control signal for the motor. For example, controller 528 may operate the motor to increase the actuator position in response to a determination that the actuator position is less than the position setpoint. Conversely, controller 528 may operate the motor to decrease the actuator position in response to a determination that the actuator position is greater than the position setpoint.

Figure 19:
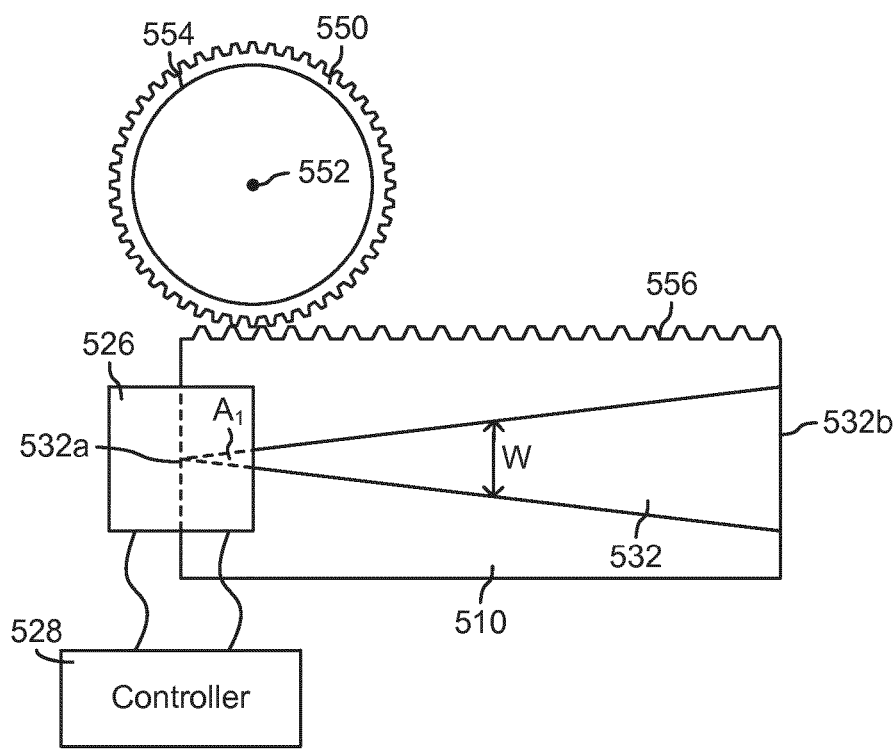
FIG. 19 is a drawing of a portion a linear actuator having a linear drive device and a conductive target coupled to the linear drive device when the linear drive device is in a minimum inductance position relative to the inductive sensor, according to an exemplary embodiment.
Figure 20:
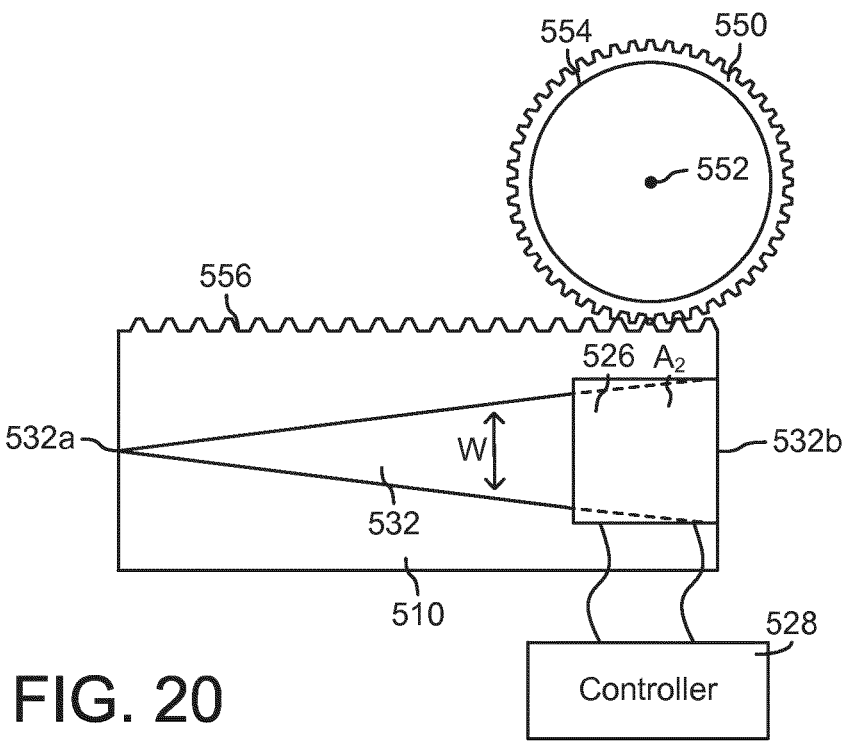
FIG. 20 is a drawing of the linear actuator of FIG. 19 when the linear drive device is in a maximum inductance position relative to the inductive sensor, according to an exemplary embodiment.

Referring now to FIGS. 19-20, several components of a linear actuator are shown, according to an exemplary embodiment. The actuator is shown to include a linear drive device 510 that moves linearly between a first end position (shown in FIG. 19) and a second end position (shown in FIG. 20). The teeth 556 of drive device 510 are coupled to the teeth 550 of a gear 554, which is driven by a motor. Operating the motor causes gear 554 to rotate about axis 552. As gear 554 rotates, drive device 510 moves linearly (e.g., left and right). As drive device 510 moves, different segments of conductive target 532 become aligned with inductive sensor 526. For example, conductive target 532 may move along with drive device 510 between the first end position (shown in FIG. 19) in which first end 532a is substantially aligned with inductive sensor 526 and a second end position (shown in FIG. 20) in which second end 532b is substantially aligned with inductive sensor 526.

The width w of conductive target 532 increases gradually from first end 532a to second end 532b. Accordingly, the area of conductive target 532 aligned with inductive sensor 526 varies as drive device 510 moves. For example, FIG. 19 shows drive device 510 in a first end position in which a minimum area $A_1$ of conductive target 532 is aligned with inductive sensor 526, whereas FIG. 18 shows drive device 510 in a second end position in which a maximum area $A_2$ of conductive target 532 is aligned with inductive sensor 526.

Controller 528 causes an AC electric current to pass through inductive sensor 526, which causes an AC magnetic field to be emitted from the front surface of inductive sensor 526. The AC magnetic field is oriented in a direction substantially perpendicular to the front surface of inductive sensor 526 and passes through the portion of conductive target 532 aligned with inductive sensor 526. The AC magnetic field induces circulating currents (i.e., Eddy currents) on the surface of conductive target 532.

The magnitude of the induced Eddy currents is a function of several factors including the area of conductive target 532 aligned with inductive sensor 526. For example, when drive device 510 is in the position shown in FIG. 19, the relatively small area $A_1$ is aligned with inductive sensor 526 and the induced Eddy currents have a relatively small magnitude. Conversely, when drive device 510 is in the position shown in FIG. 20, the relatively larger area $A_2$ is aligned with inductive sensor 526 and the induced Eddy currents have a relatively large magnitude. The induced Eddy currents generate their own (induced) magnetic field, which opposes the original magnetic field generated by the electric current flowing through inductive sensor 526 and causes a shift in the observed inductance. For example, the observed inductance may have a minimum value (i.e., minimum inductance) when drive device 510 is in the position shown in FIG. 19, and a maximum value (i.e., maximum inductance) when drive device 510 is in the position shown in FIG. 20.

Controller 528 senses the observed inductance and determines a corresponding actuator position (e.g., a linear position of drive device 510). Controller 528 may map observed inductance to actuator position using a mapping function, table, or any other type of stored relationship between inductance and actuator position. Controller 528 may use the actuator position in conjunction with a position setpoint to determine an appropriate control signal for the motor. For example, controller 528 may operate the motor to increase the actuator position in response to a determination that the actuator position is less than the position setpoint. Conversely, controller 528 may operate the motor to decrease the actuator position in response to a determination that the actuator position is greater than the position setpoint.

Inductive Sensing Circuit Diagrams

Figure 21:
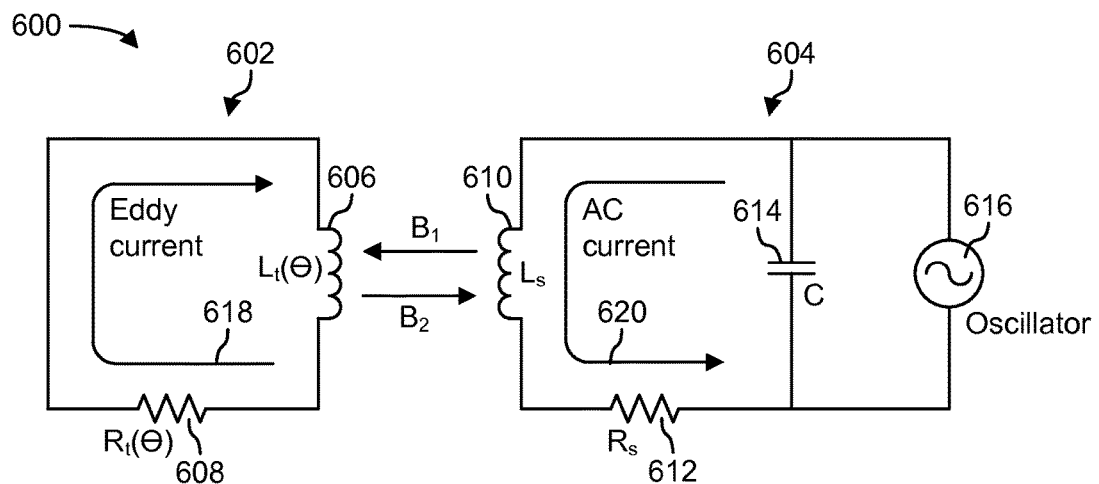
FIG. 21 is a circuit diagram illustrating the inductive sensing principles used by the actuator of actuator of FIGS. 5-7, according to an exemplary embodiment.

Referring now to FIG. 21, a circuit diagram 600 illustrating the inductive sensing principles used by the present invention is shown, according to an exemplary embodiment. Circuit diagram 600 is shown to include a target circuit 602 and a sensor circuit 604. Target circuit 602 represents conductive target 532, whereas sensor circuit 604 represents controller 528 and inductive sensor 526.

Sensor circuit 604 is shown to include an inductor 610 having an inductance $L_s$, a resistor 612 having a resistance $R_s$, and a capacitor 614 having a capacitance C. Resistor 612 is arranged in series with inductor 610, whereas capacitor 614 is arranged in parallel with the series combination of inductor 610 and resistor 612. Sensor circuit 604 is shown to include an oscillator 616, which causes an AC current 620 to flow through inductor 610. The AC current causes an AC magnetic field $B_1$ to be emitted from the surface of inductor 610 toward target circuit 602.

Target circuit 602 is shown to include an inductor 606 having an inductance $L_t(\theta)$ and a resistor 608 having a resistance $R_t(\theta)$. The inductive coupling between inductor 610 and inductor 606 depends on the actuator position (i.e., the area of conductive target 532 aligned with inductive sensor 526), represented by the variable $\theta$. Hence, both the inductance $L_t(\theta)$ and the resistance $R_t(\theta)$ are a function of the actuator position $\theta$. The magnetic field $B_1$ induces Eddy currents 618 on the surface of conductive target 532. The Eddy currents 618 flow through inductor 606, causing inductor 606 to generate another magnetic field $B_2$ that opposes the original magnetic field $B_1$. The magnitude of magnetic field $B_2$ is proportional to the magnitude of the Eddy currents 618, which also depends on the actuator position $\theta$. Accordingly, the inductance $L_t(\theta)$ and the resistance $R_t(\theta)$ can be modeled as dependent inductive and resistive components of sensor circuit 604 (as shown in FIG. 22).

Generating an AC magnetic field with just an inductor will consume a large amount of power. This power consumption can be reduced by using parallel capacitor 614, which causes sensor circuit 604 to function as a resonator. In this manner, the power consumption is reduced to the resistive losses in target circuit 602 and sensor circuit 604 (i.e., $R_s+R_t(\theta)$).

Figure 22:
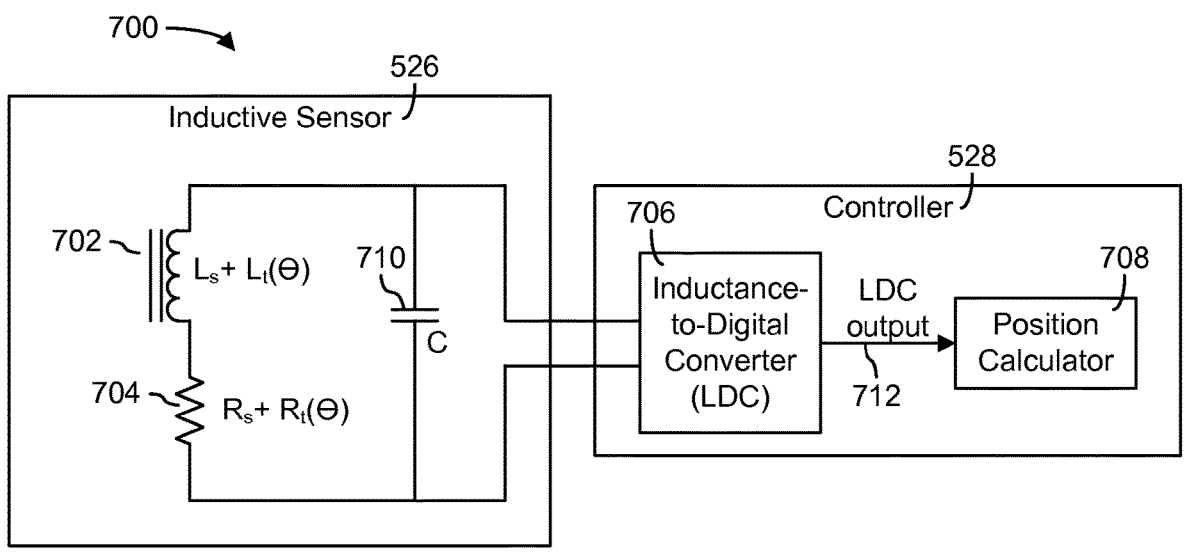
FIG. 22 is a block diagram illustrating a circuit model which may be used by a controller of the actuator, according to an exemplary embodiment.

Referring now to FIG. 22, a block diagram illustrating a circuit model 700 which may be used by controller 528 is shown, according to an exemplary embodiment. In circuit model 700, inductive sensor 526 is shown to include an inductor 702 having an inductance $L_s+L_t(\theta)$, a resistor 704 having a resistance $R_s+R_t(\theta)$, and a capacitor 710 having a capacitance C. Resistor 704 is arranged in series with inductor 702, whereas capacitor 710 is arranged in parallel with the series combination of inductor 702 and resistor 704. Notably, the inductance of inductor 702 is modeled as the combination of the sensor inductance $L_s$ and the target inductance $L_t(\theta)$ (i.e., $L_s+L_t(\theta)$). Similarly, the resistance of resistor 704 is modeled as the combination of the sensor resistance $R_s$ and the target resistance $R_t(\theta)$ (i.e., $R_s+R_t(\theta)$).

Advantageously, modeling the inductance of inductor 702 in this manner allows controller 528 to measure the combined inductance $L_s+L_t(\theta)$ and subtract the known sensor inductance $L_s$ to calculate the target inductance $L_t(\theta)$. For example, controller 528 is shown to include an inductance-to-digital converter (LDC) 706. LDC 706 may be configured to deliver an AC current through inductor 702 and measure the combined inductance $L_s+L_t(\theta)$. In some embodiments, LDC 706 provides an output (i.e., LDC output 712) to a position calculator 708 indicating the inductance $L_t(\theta)$. In other embodiments, LDC output 712 indicates another variable measured by LDC 706 (described in greater detail with reference to FIG. 24). Position calculator 708 may translate the LDC output 712 (e.g., inductance $L_t(\theta)$) to an actuator position $\theta$ using a mapping function, table, or any other type of stored relationship between the LDC output 712 and actuator position $\theta$.

Figure 23:
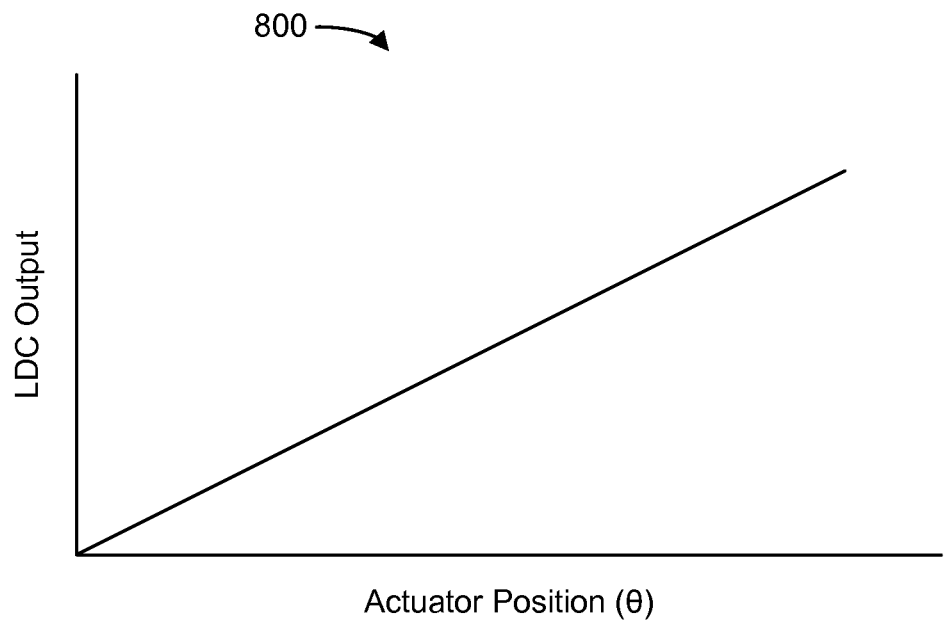
FIG. 23 is a graph illustrating a relationship between actuator position and the output of an inductance-to-digital converter (e.g., observed inductance) which may be used by the actuator controller to determine the actuator position as a function of observed inductance, according to an exemplary embodiment.

Referring now to FIG. 23, a graph 800 illustrating a relationship between actuator position $\theta$ and LDC output 712 is shown, according to an exemplary embodiment. LDC output 712 is dependent upon actuator position $\theta$ and varies as a function of actuator position $\theta$. For example, LDC output 712 may increase (e.g., linearly or non-linearly) as actuator position $\theta$ increases as shown in graph 800. As previously described, the increase in LDC output 712 may be attributable to an increase in the inductance $L_t(\theta)$, which is proportional to the area of conductive target 532 aligned with inductive sensor 526. As shown in FIGS. 17-19, the area of conductive target 532 aligned with inductive sensor 526 may increase as the actuator position increases, which results in the proportional relationship between LDC output and actuator position $\theta$ shown in graph 800.

In other embodiments, the LDC output 712 (e.g., inductance $L_t(\theta)$) may decrease as actuator position $\theta$ increases. This may occur if the area of conductive target 532 aligned with inductive sensor 526 decreases as actuator position $\theta$ increases (e.g., if first end 532*a* is wider than second end 532*b*) or if conductive target 532 is made of a material that is less electrically-conductive than sector gear 530. Accordingly, inductive sensor 526 may measure a greater inductance $L_t(\theta)$ when sector gear 530 is in the position shown in FIG. 17 and a lesser inductance $L_t(\theta)$ when sector gear 530 is in the position shown in FIG. 18. In other words, the inductance $L_t(\theta)$ may decrease as actuator position $\theta$ increases. It is contemplated that any type of relationship may exist between LDC output 712 and actuator position $\theta$, depending on the physical geometry, material selection, and location of conductive target 532. Position calculator 708 stores the relationship and uses the stored relationship to calculate actuator position $\theta$.

Figure 24:
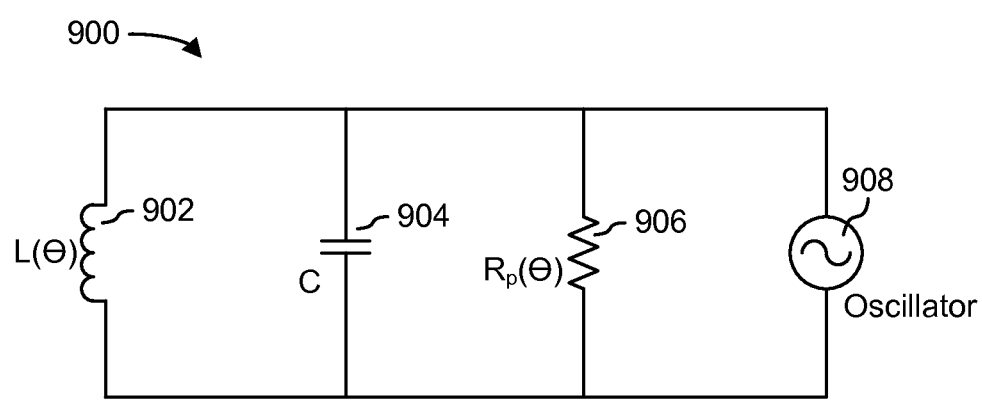
FIG. 24 is another circuit model which may be used by the actuator controller, according to an exemplary embodiment.

Referring now to FIG. 24, another circuit model 900 which may be used by controller 528 is shown, according to an exemplary embodiment. In circuit model 900, the combined inductance of inductive sensor 526 and conductive target 532 is represented by a single inductor 902 having an inductance $L(\theta)$ (e.g., $L(\theta)=L_s+L_t(\theta)$). An oscillator 908 delivers an AC current through inductor 902, as previously described. Inductor 902 is arranged in parallel with a capacitor 904 having a capacitance C and an impedance 906 having an equivalent parallel resonance impedance $R_p(\theta)$. The value of the resonance impedance $R_p(\theta)$ is given by:

$$R_p(\theta) = \frac{L_s + L_t(\theta)}{(R_s + R_t(\theta))*C}$$

In some embodiments, LDC 706 measures the equivalent parallel resonance impedance $R_p(\theta)$ and provides the value of $R_p(\theta)$ to position calculator 708 as LDC output 712. In other words, LDC output 712 may represent the equivalent parallel resonance impedance $R_p(\theta)$. Position calculator 708 may use a stored relationship between LDC output 712 (e.g., $R_p(\theta)$) and actuator position $\theta$ to calculate actuator position $\theta$ as a function of the LDC output 712 (e.g., using a mapping function, table, or other stored relationship). In other embodiments, position calculator 708 uses the previous equation to calculate $L_t(\theta)$ based on the measured value of $R_p(\theta)$ and calculates actuator position $\theta$ based on the value of $L_t(\theta)$ as previously described.

Actuator Block Diagram

Figure 25:
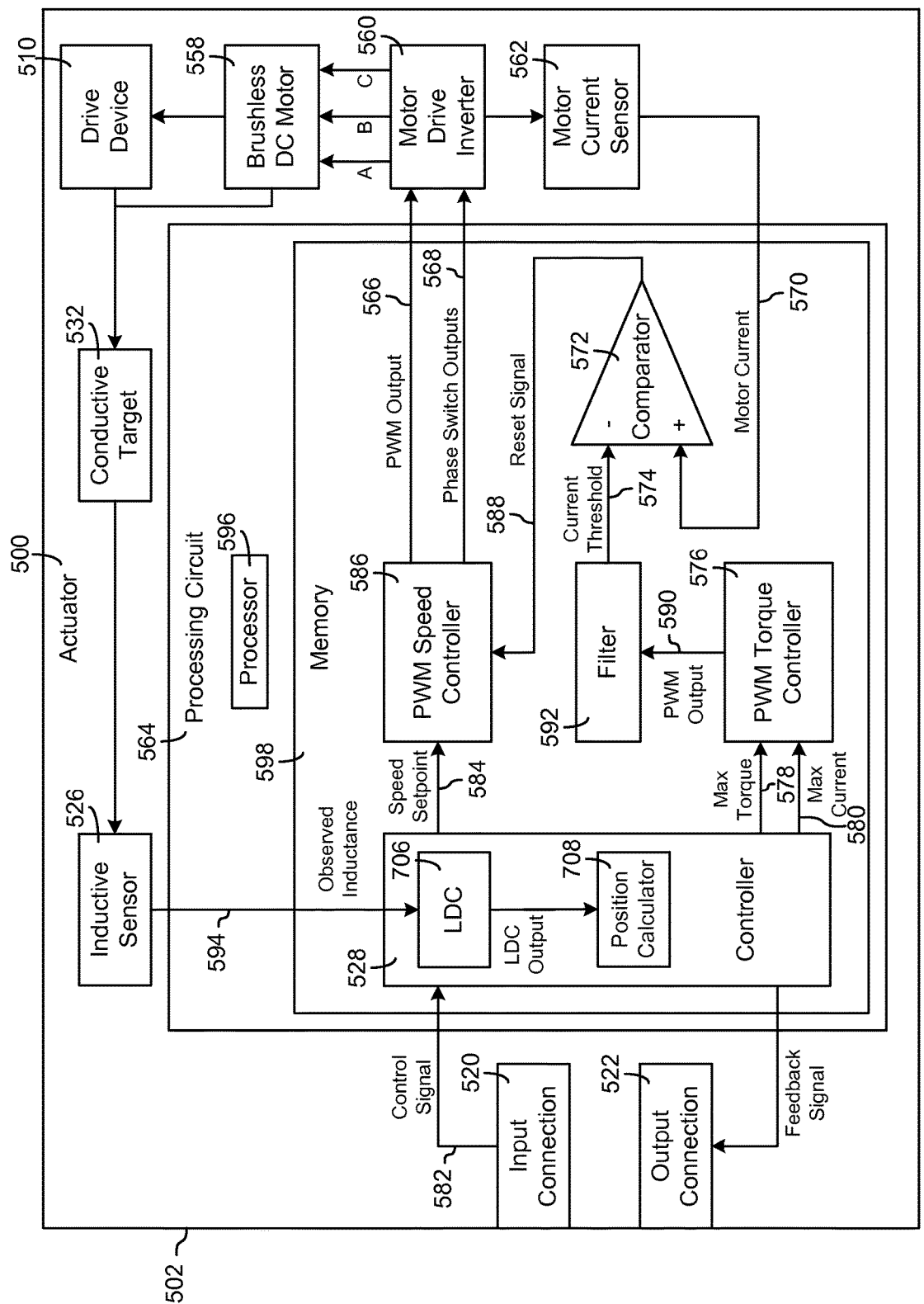
FIG. 25 is a block diagram illustrating the actuator of FIGS. 5-7 in greater detail, according to an exemplary embodiment.

Referring now to FIG. 25, a block diagram illustrating actuator 500 in greater detail is shown, according to an exemplary embodiment. Actuator 500 is shown to include input connection 520, output connection 522, and drive device 510 contained within housing 502. Actuator 500 is shown to further include a brushless DC (BLDC) motor 558 connected to drive device 510, a motor drive inverter 560 (e.g., an H-bridge) configured to provide a three-phase pulse width modulated (PWM) voltage output to BLDC motor 558, a motor current sensor 562 (e.g., a current sense resistor) configured to sense the electric current provided to BLDC motor 558, and a conductive target 532, inductive sensor 526, and controller 528 configured to measure the position of BLDC motor 558 and/or drive device 510, as previously described.

BLDC motor 558 may be connected to drive device 510 and may be configured to rotate drive device 510 through a range of rotational positions. For example, a shaft of BLDC motor 558 may be coupled to drive device 510 (e.g., via a drive train or gearing arrangement) such that rotation of the motor shaft causes a corresponding rotation of drive device 510. In some embodiments, the drive train functions as a transmission. The drive train may translate a relatively high speed, low torque output from BLDC motor 558 into a relatively low speed, high torque output suitable for driving a HVAC component connected to drive device 510 (e.g., a damper, a fluid valve, etc.). For example, the drive train may provide a speed reduction of approximately 1000:1, 2500:1, 5000:1, or any other speed reduction as may be suitable for various implementations.

BLDC motor 558 may be configured to receive a three-phase PWM voltage output (e.g., phase A, phase B, phase C) from motor drive inverter 560. The duty cycle of the PWM voltage output may define the rotational speed of BLDC motor 558 and may be determined by processing circuit 564 (e.g., a microcontroller). Processing circuit 564 may increase the duty cycle of the PWM voltage output to increase the speed of BLDC motor 558 and may decrease the duty cycle of the PWM voltage output to decrease the speed of BLDC motor 558. Processing circuit 564 is shown providing a PWM voltage output 566 and phase switch outputs 568 to motor drive inverter 560. Motor drive inverter 560 may use phase switch outputs 568 to apply PWM output 566 to a particular winding of BLDC motor 558. In some embodiments, motor drive inverter 560 operates as described in U.S. patent application Ser. No. 14/581,373, filed Dec. 23, 2014, the entire disclosure of which is incorporated by reference herein.

Motor current sensor 562 may be configured to measure the electric current provided to BLDC motor 558. Motor current sensor 562 may generate a feedback signal indicating the motor current 570 and may provide feedback signal to processing circuit 564. Processing circuit 564 may be configured to compare the motor current 570 to a threshold 574 (e.g., using comparator 572) and may hold PWM output 566 in an off state when motor current 570 exceeds threshold 574. Processing circuit 564 may also be configured to set PWM output 566 to zero and then ramp up PWM output 566 when the position of drive device 510 approaches an end stop. These and other optional features of actuator 500 are described in greater detail in U.S. patent application Ser. No. 14/809,119, filed Jul. 24, 2015, the entire disclosure of which is incorporated by reference herein.

Still referring to FIG. 25, processing circuit 564 is shown to include a processor 596 and memory 598. Processor 596 may be a general purpose or specific purpose processor, an application specific integrated circuit (ASIC), one or more field programmable gate arrays (FPGAs), a group of processing components, or other suitable processing components. Processor 596 may be configured to execute computer code or instructions stored in memory 598 or received from other computer readable media (e.g., CDROM, network storage, a remote server, etc.).

Memory 598 may include one or more devices (e.g., memory units, memory devices, storage devices, etc.) for storing data and/or computer code for completing and/or facilitating the various processes described in the present disclosure. Memory 598 may include random access memory (RAM), read-only memory (ROM), hard drive storage, temporary storage, non-volatile memory, flash memory, optical memory, or any other suitable memory for storing software objects and/or computer instructions. Memory 598 may include database components, object code components, script components, or any other type of information structure for supporting the various activities and information structures described in the present disclosure. Memory 598 may be communicably connected to processor 596 via processing circuit 564 and may include computer code for executing (e.g., by processor 596) one or more processes described herein. When processor 596 executes instructions stored in memory 598, processor 596 generally configures actuator 500 (and more particularly processing circuit 564) to complete such activities.

Processing circuit 564 is shown to include a controller 528. Controller 528 may be configured to receive control signals 582 from input connection 520 (e.g., position setpoints, speed setpoints, etc.) and observed inductance signals 594 from inductive sensor 526. Controller 528 may be configured to determine the position of BLDC motor 558 and/or drive device 510 based on the observed inductance signals 594, as previously described. In some embodiments, controller 528 calculates the speed of BLDC motor 558 and/or drive device 510 using a difference in the measured positions over time. For example, the speed of BLDC motor 558 may be determined by controller 528 using a measured time between position measurements.

Controller 528 may determine an appropriate speed setpoint 584 for BLDC motor 558 (e.g., in percentage terms, in terms of absolute position or speed, etc.). In some embodiments, controller 528 provides speed setpoint 584 to PWM speed controller 586. In other embodiments, controller 528 calculates an appropriate PWM duty cycle to achieve a desired speed and provides the PWM duty cycle to PWM speed controller 586. In some embodiments, controller 528 calculates speed setpoint 584 based on the position of drive device 510. For example, controller 528 may be configured to set speed setpoint 584 to zero when the position of drive device is within a predetermined distance from an end stop. Controller 528 may then cause speed setpoint 584 to ramp up until the end stop is reached.

Still referring to FIG. 25, processing circuit 564 is shown to include a PWM speed controller 586. PWM speed controller 586 may receive a speed setpoint 584 and/or a PWM duty cycle from controller 528. PWM speed controller 586 may generate PWM output 566 (e.g., a PWM DC voltage output) and provide PWM output 566 to motor drive inverter 560. The duty cycle of PWM output 566 may determine the speed of rotation for BLDC motor 558. The width of the output PWM pulses can be adjusted by PWM speed controller 586 to achieve varying commanded motor speeds and/or to obtain varying motor or actuator positions.

In some embodiments, PWM speed controller 586 provides phase switch outputs 568 to motor drive inverter 560. Phase switch outputs 568 may be used by motor drive inverter 560 to control the polarity of the PWM output 566 provided to the windings of BLDC motor 558. In some embodiments, motor drive inverter 560 is an H-bridge. In other embodiments, other switching circuits or controls may be used to controllably vary the phase switching in synchronization with the desired speed or rotation of BLDC motor 558.

Still referring to FIG. 25, motor current sensor 562 may be coupled to motor drive inverter 560 in a manner that allows current sensor 562 to provide an output (e.g., a voltage output) that indicates the amount of the electric current 570 provided to BLDC motor 558 on any phase line. A reading representative of sensed current 570 may be provided from motor current sensor 562 to comparator 572. Comparator 572 may be a discrete electronics part or implemented as part of controller 528 or another controller that forms a part of processing circuit 564. Comparator 572 may be configured to compare motor current 570 to an electric current threshold 574.

If the motor current 570 from current sensor 562 exceeds the threshold 574, comparator 572 may output a reset signal 588 to PWM speed controller 586. The application of reset signal 588 may cause PWM speed controller 586 to turn off PWM output 566 (e.g., by changing PWM output 566 to a duty cycle of 0%, setting PWM output 566 to zero, etc.) for a period of time or until comparator 572 indicates that motor current 570 no longer exceeds threshold 574. In other words, if the current threshold 574 for BLDC motor 558 is exceeded, comparator 572 may begin to interfere with PWM output 566 (e.g., by holding PWM output 566 in an off state), thereby causing BLDC motor 558 to slow down. Since the torque provided by BLDC motor 558 is proportional to motor current 570, both the electric current and torque of BLDC motor 558 can be limited by the application of reset signal 588.

The current threshold 574 may be controlled by controller 528. For example, threshold 574 may start as a digital value stored within controller 528 (e.g., a maximum torque threshold 578 or a maximum current threshold 580). Controller 528 may control threshold 574 by adjusting the thresholds 578 and/or 580 provided to PWM torque controller 576. Controller 528 may increase threshold 574 by increasing the maximum torque threshold 578 and/or the maximum current threshold 580. Controller 528 may decrease threshold 574 by decreasing the maximum torque threshold 578 and/or the maximum current threshold 580.

PWM torque controller 576 may be configured to generate a PWM output 590 based on the maximum torque 578 and/or maximum current 580 provided by controller 528. PWM torque controller 576 may convert the thresholds 578 and/or 580 to a PWM output 590 and provide the PWM output 590 to filter 592. Filter 592 may be configured to convert the PWM output 590 from PWM torque controller 576 into a current threshold 574 (e.g., a DC voltage representative of an electric current) for comparison to the output of current sensor 562 using a filter 592. In some embodiments, filter 592 is a first order low pass filter having a resistor in series with the load and a capacitor in parallel with the load. In other embodiments, filter 592 may be a low pass filter of a different order or a different type of filter.

In some embodiments, the threshold 574 provided to comparator 572 is based on a temperature sensor input. As the temperature sensor input varies (e.g., based on the changing ambient temperature, based on a temperature of a motor element, etc.), controller 528 may cause the threshold 574 to be adjusted. For example, as the temperature sensor input changes, controller 528 may adjust the thresholds 578 and/or 580 provided to PWM torque controller 576. Adjusting the thresholds 578 and/or 580 provided to PWM torque controller 576 may cause the duty cycle of PWM output 590 to change, which causes a corresponding change in the current threshold 574 output by filter 592.

In various embodiments, threshold 574 may be adjusted automatically by controller 528, adjusted by a user, or may be a static value. In some embodiments, threshold 574 is a static or dynamic value based on one or more variables other than ambient temperature. For example, threshold 574 may be set to a value that corresponds to the maximum current that can safely be provided to BLDC motor 558 or a maximum torque that can safely be provided by BLDC motor 558 to drive device 510.

Inductive Position Sensing Method

Figure 26:
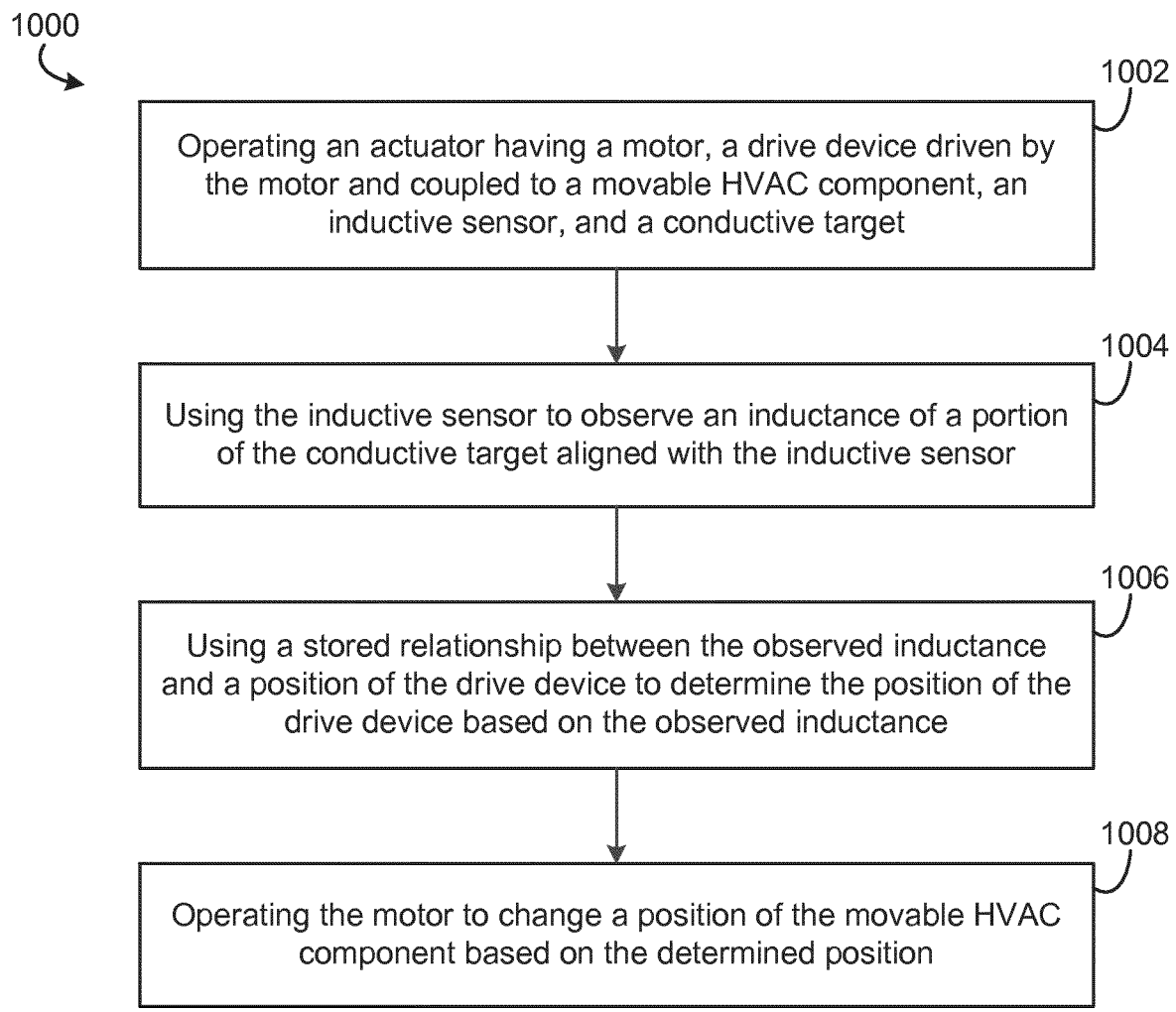
FIG. 26 is a flowchart of a process for sensing an actuator position using an inductive sensor, according to an exemplary embodiment.

Referring now to FIG. 26, a flowchart of a process 1000 for sensing an actuator position using an inductive sensor is shown, according to an exemplary embodiment. Process 1000 may be performed by one or more components of actuator 500, as described with reference to FIGS. 5-25. For example, process 1000 may be performed by controller 528 using input from inductive sensor 526 and providing output to BLDC motor 558.

Process 1000 is shown to include operating an actuator having a motor, a drive device driven by the motor, an inductive sensor, and a conductive target (step 1002). The drive device may be coupled to a movable HVAC component (e.g., a damper, a valve, etc.) and configured to move the movable HVAC component between multiple positions. In some embodiments, the inductive sensor is fixed to a stationary component of the actuator and the conductive target moves relative to the inductive sensor as the movable HVAC component is driven between the multiple positions.

In some embodiments, the actuator is a rotary actuator including a sector gear that rotates as the movable HVAC component is driven between the multiple positions. The conductive target may be coupled to the sector gear and may move along with the sector gear. In other embodiments, the actuator is a linear actuator including a linear component that moves along a linear range of motion as the movable HVAC component is driven between the multiple positions. The conductive target may be coupled to the linear component and may move along with the linear component.

In some embodiments, the conductive target is coupled directly to a movable component of the actuator (e.g., sector gear 530, one of gears 534-540, drive device 510, etc.) and has an electrical conductivity that exceeds an electrical conductivity of the movable component to which the conductive target is coupled. For example, the conductive target may be made of a highly conductive metal (e.g., copper, nickel, etc.) or a conductive trace. The high electrical conductivity of the conductive target increases an inductance of the conductive target relative to the movable component of the actuator to which the conductive target is coupled.

In some embodiments, the conductive target includes a first end having a first width (e.g., end 532*a*), a second end having a second width greater than the first width (e.g., end 532*b*), and a middle portion extending between the first end and the second end. The middle portion may have a width w that increases gradually from the first width (at the first end) to the second width (at the second end). The varying width of the conductive target may cause each segment or portion of the conductive target to have a different area. The inductance of each portion of the conductive target may be proportional to the area of the portion.

Still referring to FIG. 26, process 1000 is shown to include using the inductive sensor to observe an inductance of a portion of the conductive target aligned with the inductive sensor (step 1004). The conductive target may be coupled to the drive device such that a portion of the conductive target aligns with the inductive sensor. Multiple different portions of the conductive target may become aligned with the inductive sensor as the movable HVAC component is driven between the multiple positions. Each of the multiple different portions of the conductive target may have a different inductance (e.g., due to the different areas and/or widths of each portion).

In some embodiments, step 1004 includes delivering an AC current through an inductor integrated with the inductive sensor. The AC current may cause a first magnetic field to be emitted from the inductive sensor. The first magnetic field may cause Eddy currents in the conductive target. The inductive sensor may sense a second magnetic field caused by the Eddy currents in the conductive target. A strength of the second magnetic field may be proportional to an inductance of the portion of the conductive target aligned with the inductive sensor. Accordingly, the inductive sensor can observe (e.g., measure, determine, etc.) the inductance of the portion of the conductive target aligned with the inductive sensor by sensing the strength of the second magnetic field.

Process 1000 is shown to include using a stored relationship between the observed inductance and a position of the drive device to determine the position of the drive device based on the observed inductance (step 1006). Step 1006 may be performed by position calculator 708 as described with reference to FIG. 22. In some embodiments, step 1006 includes translating the observed inductance to an actuator position using a mapping function, table, or any other type of stored relationship between the observed inductance and the actuator position (e.g., the function shown in graph 800).

Process 1000 is shown to include operating the motor to change a position of the movable HVAC component based on the determined position (step 1008). In some embodiments, step 1008 includes using the actuator position in conjunction with a position setpoint to determine an appropriate control signal for the motor. For example, step 1008 may include operating the motor to increase the actuator position in response to a determination that the actuator position is less than the position setpoint. Step 1008 may include operating the motor to decrease the actuator position in response to a determination that the actuator position is greater than the position setpoint.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A linear actuator comprising:
   an inductive sensor;
   a linear component configured to move along a linear range of motion as a position of the actuator changes;
   a conductive target coupled to the linear component and configured to move along with the linear component, the conductive target having multiple different portions that become aligned with the inductive sensor as the position of the actuator changes, each of the multiple different portions having a different inductance; and
   a controller configured to:
      receive a signal from the inductive sensor indicating an observed inductance of the portion of the conductive target aligned with the inductive sensor;
      use a stored relationship between the observed inductance and the position of the actuator to determine the position of the actuator based on the observed inductance; and
      operate the actuator to change the position of the actuator based on the determined position.

2. The actuator of claim 1, wherein the conductive target is coupled directly to a movable component of the actuator and has an electrical conductivity that exceeds an electrical conductivity of the movable component to which the conductive target is coupled.

3. The actuator of claim 1, wherein the conductive target comprises:
   a first end having a first width;
   a second end having a second width greater than the first width; and
   a middle portion extending between the first end and the second end and having a width that increases gradually from the first width to the second width.

4. The actuator of claim 1, wherein:
   each of the multiple different portions of the conductive target has a different area; and
   the inductance of each portion of the conductive target is proportional to the area of the corresponding portion.

5. The actuator of claim 1, wherein the inductive sensor is fixed to a stationary component of the actuator and the conductive target is configured to move relative to the inductive sensor as the movable HVAC component is driven between the multiple positions.

6. A method for controlling a HVAC actuator that includes a motor, a drive device driven by the motor and coupled to a movable HVAC component, an inductive sensor, and a conductive target, the method comprising:
   using the inductive sensor to observe an inductance of a portion of the conductive target aligned with the inductive sensor, wherein multiple different portions of the conductive target become aligned with the inductive sensor as the movable HVAC component is driven between multiple positions, each of the multiple different portions having a different inductance and a different area, wherein the inductance of each portion of the conductive target is proportional to the area of the corresponding portion;
   using a stored relationship between the observed inductance and a position of the drive device to determine the position of the drive device based on the observed inductance; and
   operating the motor to change a position of the movable HVAC component based on the determined position.

7. The method of claim 6, wherein observing the inductance of the portion of the conductive target aligned with the inductive sensor comprises:
   delivering an AC current through an inductor integrated with the inductive sensor;
   emitting a first magnetic field from the inductive sensor as a result of delivering the AC current through the inductor, the first magnetic field causing Eddy currents in the conductive target; and
   sensing a second magnetic field caused by the Eddy currents in the conductive target, wherein a strength of the second magnetic field is proportional to an inductance of the portion of the conductive target aligned with the inductive sensor.

8. The method of claim 6, wherein:
   the actuator is a rotary actuator comprising a sector gear that rotates as the movable HVAC component is driven between the multiple positions; and
   the conductive target is coupled to the sector gear and moves along with the sector gear.

9. The method of claim 6, wherein:
the actuator is a linear actuator comprising a linear component that moves along a linear range of motion as the movable HVAC component is driven between the multiple positions; and
the conductive target is coupled to the linear component and moves along with the linear component.

10. The method of claim 6, wherein the conductive target is coupled directly to a movable component of the actuator and has an electrical conductivity that exceeds an electrical conductivity of the movable component to which the conductive target is coupled.

11. The method of claim 6, wherein the conductive target comprises:
a first end having a first width;
a second end having a second width greater than the first width; and
a middle portion extending between the first end and the second end and having a width that increases gradually from the first width to the second width.

12. The method of claim 6, wherein the inductive sensor is fixed to a stationary component of the actuator and the conductive target is configured to move relative to the inductive sensor as the movable HVAC component is driven between the multiple positions.

13. An actuator comprising:
an inductive sensor;
a conductive target having multiple different portions that become aligned with the inductive sensor as a position of the actuator changes, each of the multiple different portions having a different inductance and a different area, wherein the inductance of each portion of the conductive target is proportional to the area of the corresponding portion; and
a controller configured to:
receive a signal from the inductive sensor indicating an observed inductance of the portion of the conductive target aligned with the inductive sensor;
use a stored relationship between the observed inductance and the position of the actuator to determine the position of the actuator based on the observed inductance; and
operate the actuator to change the position of the actuator based on the determined position.

14. The actuator of claim 13, wherein:
the actuator is a rotary actuator comprising a sector gear configured to rotate as the position of the actuator changes; and
the conductive target is coupled to the sector gear and configured to move along with the sector gear.

15. The actuator of claim 13, wherein the inductive sensor is fixed to a stationary component of the actuator and the conductive target is configured to move relative to the inductive sensor as the movable HVAC component is driven between the multiple positions.

16. The actuator of claim 13, wherein the conductive target is coupled directly to a movable component of the actuator and has an electrical conductivity that exceeds an electrical conductivity of the movable component to which the conductive target is coupled.

17. The actuator of claim 13, wherein the conductive target comprises:
a first end having a first width;
a second end having a second width greater than the first width; and
a middle portion extending between the first end and the second end and having a width that increases gradually from the first width to the second width.

18. The actuator of claim 13, wherein:
the actuator is a linear actuator comprising a linear component configured to move along a linear range of motion as the position of the actuator changes; and
the conductive target is coupled to the linear component and configured to move along with the linear component.

19. The actuator of claim 13, wherein the inductive sensor is configured to generate the signal indicating the observed inductance by:
delivering an AC current through an inductor integrated with the inductive sensor;
emitting a first magnetic field from the inductive sensor as a result of delivering the AC current through the inductor, the first magnetic field causing Eddy currents in the conductive target; and
sensing a second magnetic field caused by the Eddy currents in the conductive target, wherein a strength of the second magnetic field is proportional to an inductance of the portion of the conductive target aligned with the inductive sensor.

* * * * *